(12) United States Patent
Montgomery

(10) Patent No.: US 11,732,843 B2
(45) Date of Patent: Aug. 22, 2023

(54) ON-TANK REGULATOR FOR HIGH-PRESSURE TANK

(71) Applicant: Caterpillar Inc., Peoria, IL (US)

(72) Inventor: David T. Montgomery, Edelstein, IL (US)

(73) Assignee: Caterpillar Inc., Peoria, IL (US)

(*) Notice: Subject to any disclaimer, the term of this patent is extended or adjusted under 35 U.S.C. 154(b) by 86 days.

(21) Appl. No.: 17/379,935

(22) Filed: Jul. 19, 2021

(65) Prior Publication Data

US 2023/0014654 A1    Jan. 19, 2023

(51) Int. Cl.
*F17C 7/00* (2006.01)
*F17C 1/00* (2006.01)

(52) U.S. Cl.
CPC .............. *F17C 1/00* (2013.01); *F17C 7/00* (2013.01); *F17C 2203/0619* (2013.01); *F17C 2205/0338* (2013.01); *F17C 2221/012* (2013.01); *F17C 2265/066* (2013.01); *F17C 2270/0184* (2013.01)

(58) Field of Classification Search
CPC ...... F17C 1/00; F17C 7/00; F17C 2203/0619; F17C 2205/0338; F17C 2221/012; F17C 2265/066; F17C 2270/0184
See application file for complete search history.

(56) References Cited

U.S. PATENT DOCUMENTS

| | | | | |
|---|---|---|---|---|
| 5,996,625 A * | 12/1999 | Collado | ................. | F17C 13/04 137/614.19 |
| 6,527,009 B2 * | 3/2003 | Zheng | ................... | F17C 13/025 137/15.04 |
| 7,007,714 B2 * | 3/2006 | Carroll | ................. | G05D 16/103 137/613 |
| 7,237,570 B2 * | 7/2007 | Gamard | ............... | G05D 7/0133 137/614.19 |
| 7,426,935 B2 * | 9/2008 | Schwan | .................... | F17C 7/00 137/263 |

(Continued)

FOREIGN PATENT DOCUMENTS

| | | |
|---|---|---|
| JP | 6201830 B2 | 9/2017 |
| KR | 101909438 B1 | 10/2018 |
| WO | 2019228876 A1 | 12/2019 |

OTHER PUBLICATIONS

Written Opinion and International Search Report for Int'l. Patent Appln. No. PCT/US2022/035044, dated Oct. 21, 2022 (15 pgs).

*Primary Examiner* — Nicolas A Arnett
(74) *Attorney, Agent, or Firm* — Lee & Hayes, P.C.

(57) ABSTRACT

A storage tank includes a tank wall, a pressure regulator, a low-pressure coupling, and a fill coupling. The tank wall of the storage tank is configured to contain a stored fluid at an internal pressure within the tank wall, the tank wall including an outer layer, an inner layer, and a regulator mount. The pressure regulator of the storage tank is connected to the regulator mount and is configured to receive a flow rate of the stored fluid and reduce the stored fluid from the internal pressure to an output pressure. The flow rate of the stored fluid is provided, via the low pressure coupling and at the output pressure to an external system. The fill coupling extends through the tank wall and receives the stored fluid from a fluid source to be stored within the storage tank.

20 Claims, 6 Drawing Sheets

(56) References Cited

U.S. PATENT DOCUMENTS

| | | | |
|---|---|---|---|
| 7,481,241 B2 * | 1/2009 | Carpenter | G05D 16/103 137/505.28 |
| 8,136,791 B2 * | 3/2012 | Denis | F17C 13/12 137/320 |
| 8,336,577 B2 * | 12/2012 | MacNeal | B67D 99/00 137/530 |
| 8,360,101 B2 * | 1/2013 | Kremer | F16K 1/306 251/149.6 |
| 8,492,047 B2 * | 7/2013 | Hwang | B60K 15/03006 429/444 |
| 9,360,162 B2 * | 6/2016 | Larsen | B67D 1/1252 |
| 10,209,158 B2 * | 2/2019 | Cho | G01M 3/3281 |
| 10,422,482 B2 * | 9/2019 | Bernard | F17C 13/02 |
| 11,085,585 B2 * | 8/2021 | Trimble | F41B 11/70 |
| 11,085,586 B2 * | 8/2021 | Trimble | F16K 31/60 |
| 11,300,250 B2 * | 4/2022 | Sellen | G05D 16/103 |
| 11,372,431 B1 * | 6/2022 | Carter | G05D 16/107 |
| 2008/0035221 A1 * | 2/2008 | Gawryjolek | G05D 7/0126 137/613 |
| 2009/0145494 A1 * | 6/2009 | Udischas | F17C 13/04 137/505 |
| 2009/0223976 A1 * | 9/2009 | Denis | F17C 13/04 137/613 |
| 2009/0255940 A1 * | 10/2009 | Murate | F17C 1/16 220/661 |
| 2010/0112411 A1 * | 5/2010 | Lee | H01M 8/04201 429/456 |
| 2016/0179107 A1 * | 6/2016 | Pemberton | F17C 1/00 222/173 |
| 2017/0122497 A1 * | 5/2017 | Bernard | F17C 13/04 |
| 2020/0309326 A1 * | 10/2020 | Muller | F17C 13/04 |
| 2021/0341106 A1 * | 11/2021 | Jones | F17C 13/00 |

\* cited by examiner

ON-TANK REGULATOR FOR HIGH-PRESSURE TANK

TECHNICAL FIELD

The present disclosure relates to systems and methods for storing pressurized fluids. More specifically, the present disclosure relates to an on-tank regulator that enables a tank to store high-pressure fluids, such as hydrogen, and discharge stored fluids at a relatively lower pressure.

BACKGROUND

Increasingly, hydrogen fuel cells and engines are being considered to power and drive various systems and machines utilized in industry, but utilization of hydrogen as a fuel presents a set of challenges different from other energy sources commonly utilized today. The hydrogen used for fuel cells and engines is stored within high-pressure tanks that are configured to withstand pressures greater than 100 bar. More specifically, high-pressure tanks are a viable storage vessel for hydrogen due to hydrogen not liquifying at non-cryogenic temperatures. Accordingly, two common methods of storing sufficient quantities of hydrogen are liquifying hydrogen through cryogenic processes and high-pressure storage of gaseous hydrogen. Couplings between the storage tank and the external systems often experience increased degradation caused by repeated connecting and disconnecting, and under the elevated pressures associated with hydrogen storage and the small molecular size of hydrogen, leakage can become a problem. Additionally, the degradation of such couplings represents a safety concern due to the wide flammability limits and low ignition energy of hydrogen.

Further, utilization of an integrated storage tank to store hydrogen for a power system often results in poor filling of the storage tank due to hydrogen heating as it is compressed. In particular, and at normal temperatures (e.g., room temperature, 20 degrees Celsius, etc.), hydrogen has a physical property where throttling hydrogen causes an increase in the temperature of hydrogen and increasing the temperature of hydrogen also increases the pressure inside of a closed container. Additionally, filling the integrated storage tank with hydrogen increases the pressure, causing an increase in temperatures, that then results in a feedback loop where pressurizing hydrogen fuel heats the hydrogen fuel and causes the hydrogen fuel to expand and/or experience elevated pressures. The increasing temperature and pressure results in an amount of hydrogen being provided to the storage tank that causes a pressure based fill gauge of the storage tank to indicate that the tank is fully pressurized, but that also causes the storage tank to experience a drop in internal pressure as the amount of hydrogen reaches thermal equilibrium with the surrounding environment. Accordingly, removable storage tanks for hydrogen currently experience degradation of couplings between the storage tank and the external systems due to repeated coupling and decoupling of wearing down the couplings. Further, integrated storage tanks for hydrogen currently are unable to be fully filled before the external system returns to operation.

An example storage tank system is described in U.S. Pat. No. 8,492,047 (hereinafter referred to as "the '047 reference"). In particular, the '047 reference describes a compressed hydrogen storage system that utilizes a plurality of storage tanks to contain compressed hydrogen. In this system, compressed hydrogen is provided to the plurality of hydrogen storage tanks via a high-pressure fluid line, and the flow of hydrogen into the tanks is controlled using a solenoid valve disposed within a pressure regulator. As explained in the '047 reference, the storage tanks are permanently connected to a fuel cell or hydrogen engine which consumes compressed hydrogen received from the storage tanks. However, the system described in the '047 reference has several deficiencies. For example, and as described above, due to the permanent connection between the storage tanks and the downstream components receiving the stored hydrogen, it may not be possible to completely refill the hydrogen tanks during use. In particular, due to this configuration, filling the storage tank system described by the '047 reference requires that the machine attached to the storage tanks remain inoperable for an extended period of time while the tanks reach equilibrium or for the storage tanks to be partially filled before the machine returns to operation. As a result, the machine utilizing the storage tank system is either decommissioned for the extended period of time, has a shortened operating time due to the partial fill of the storage tanks, and/or must carry a larger volume of storage tanks to make up for the inefficient filling of the storage tanks.

Examples of the present disclosure are directed toward overcoming the deficiencies described above.

SUMMARY OF THE INVENTION

Examples of the present disclosure are directed to a system that includes a compressed fluid storage assembly that is comprised of a storage tank, a pressure regulator, a low-pressure coupling, and a fill coupling. The storage tank can define an interior space that is configured to store a compressed fluid at a first pressure. Additionally, the pressure regulator can be connected to the storage tank and fluidly connected to the interior space. Further, the low-pressure coupling can be fluidly connected to the pressure regulator and the fill coupling can be fluidly connected to the interior space. Accordingly, the pressure regulator can be configured to receive the compressed fluid, at the first pressure, from the interior space and to direct the compressed fluid to the low-pressure coupling at a second pressure less than the first pressure. The low-pressure coupling can be configured to form a releasable fluid connection with an external system, and to direct the compressed fluid, at the second pressure, to the external system via the releasable fluid connection. The fill coupling can be configured to receive the compressed fluid, at the first pressure, and to direct the compressed fluid to the interior space.

Further examples of the present disclosure are directed to a system that includes a power system, a storage tank, a pressure regulator, a low-pressure coupling, and a fill coupling. In particular, the system can include a power system that is configured to receive compressed hydrogen and generate output power using the compressed hydrogen as an input. Additionally, the system can include the storage tank defining an interior space, the interior space being configured to store the compressed hydrogen at a first pressure, the pressure regulator connected to the storage tank and fluidly connected to the interior space, and the low-pressure coupling fluidly connected to the pressure regulator. Further, the pressure regulator can be configured to receive the compressed hydrogen, at the first pressure, from the interior space, and to direct the compressed hydrogen to the low-pressure coupling at a second pressure less than the first pressure. The low-pressure coupling can be configured to form a releasable fluid connection with the power system, and direct the compressed hydrogen, at the second pressure, to the power system via the releasable fluid connection.

Similarly, the fill coupling fluidly can be connected to the interior space, the fill coupling being configured to receive the compressed hydrogen, at the first pressure, and to direct the compressed hydrogen to the interior space.

Still further examples of the present disclosure are directed to a method that includes storing a compressed fluid at a first pressure and providing the compressed fluid at a second pressure. In particular, the method can include storing, within a storage tank, a compressed fluid at a first pressure, the storage tank including a pressure regulator. Additionally, the method can include directing the compressed fluid from the storage tank to the pressure regulator, the pressure regulator reducing a pressure of the compressed fluid from the first pressure to a second pressure less than the first pressure. Further, the method can include directing the compressed fluid, at the second pressure, from the pressure regulator to a low-pressure coupling, the low-pressure coupling configured to provide the compressed fluid to an external system. Accordingly, the method can include providing the compressed fluid, at the second pressure, to the external system via the low-pressure coupling.

DETAILED DESCRIPTION

Systems and techniques described below are directed to high-pressure tanks that include a regulator configured to reduce an output pressure of the high-pressure tank from an internal pressure to an output pressure. As will be described in greater detail below, such example systems may include a check valve that enables filling of the high-pressure tank, a low pressure coupling that enables an external system to receive fluid from the high-pressure tank, and/or a configurable regulator that enables a high-pressure fluid to be stored and a low-pressure fluid to be output.

Figure 1:
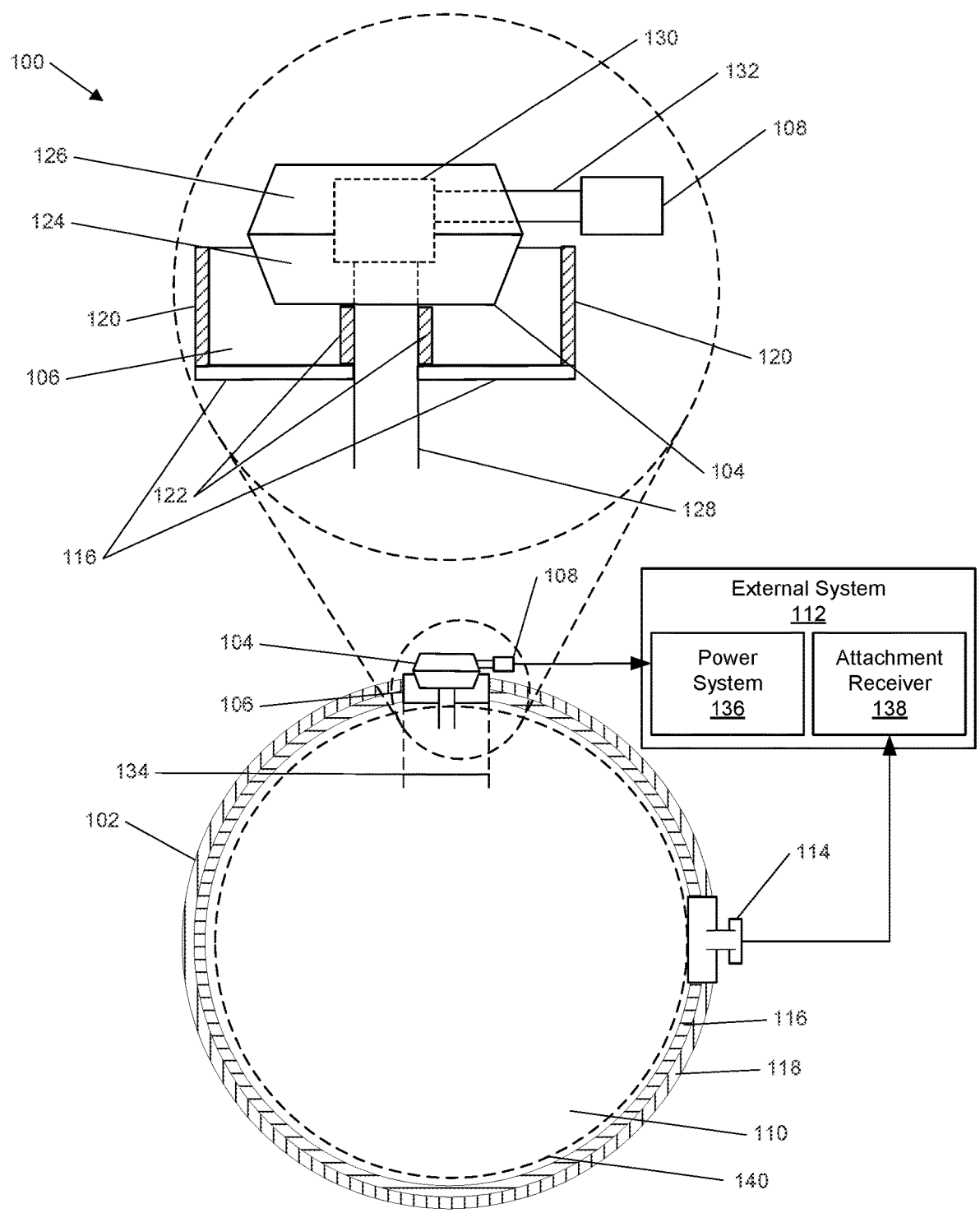
FIG. 1 illustrates a system having a high-pressure tank, and a pressure regulator in fluid communication with a stored fluid according to examples of the present disclosure.

FIG. 1 illustrates a cross-sectional view of an example high-pressure tank 100. For the purposes of this disclosure, the high-pressure tank 100 is depicted and described as including a tank wall 102, a pressure regulator 104, a regulator mount 106, and a low-pressure coupling 108. As shown in FIG. 1, a stored fluid 110 may be stored in the high-pressure tank 100 at any desired pressure. In particular, the high-pressure tank 100 can be a refillable storage tank for the stored fluid 110 that is compressed and stored at high pressure. Additionally, the high-pressure tank 100 can be configured to output the stored fluid 110 to an external system 112 that utilizes the stored fluid 110 at a lower pressure than the internal pressure of the high-pressure tank 100. The pressure regulator 104 can be a static fixture of the high-pressure tank 100 that enables the high-pressure tank 100 to be connected to the external system 112 via the low-pressure coupling 108. Integration of the pressure regulator 104 into the high-pressure tank can enable the high-pressure tank 100 and the pressure regulator 104 to be configured such that a connection to the external system 112 is a low-pressure coupling 108 that is safer and more robust than other couplings between the high-pressure tank 100 and the external system 112. As will be described in greater detail below, integration of the pressure regulator 104 with the high-pressure tank 100 enables the low-pressure coupling 108 to be utilized for connecting the high-pressure tank 100 to the external system 112.

In some examples, the high-pressure tank 100 can be a spherical tank including a port, a hole, and/or other opening 134 that is configured to receive the regulator mount 106. Alternatively, the high-pressure tank 100 can be a cylindrical tank (not illustrated), and in such examples, the high-pressure tank 100 comprises a first spherical end and a second spherical end that, together, cap the ends of a tube, providing a cylindrical vessel with spherical end caps. More specifically, the first end can be a top of the high-pressure tank 100 that is opposite the second end, wherein the second end is a base of the high-pressure tank 100. Accordingly, and independent of the specific configuration, the high-pressure tank 100 can comprise an interior space 140 within and/or otherwise defined by the one or more tank walls described herein. Further, the tank wall 102 can be a single, formed wall and/or can be formed from a plurality of components (e.g., the first end, the second end, the third wall) that are formed by winding a continuous fiber saturated with a thermosetting polymer (epoxy) around a "bag", connected via weld joints, secured via fasteners (e.g., screws, bolts, rivets, etc.), and/or cast to form the high-pressure tank 100. While FIG. 1 depicts the high-pressure tank 100 as a sphere having a substantially circular cross-section, the high-pressure tank 100 can take the form of a cuboid, a triangular prism, a hexagonal prism, and/or other three-dimensional (3D) shapes for containment of the stored fluid 110 (e.g., hydrogen).

In some examples, the pressure regulator 104 is attached to the regulator mount 106. The pressure regulator 104 is configured to regulate a fluid pressure of the stored fluid 110 as the stored fluid is received from the interior space 140 and provided to the external system 112. More specifically, the pressure regulator 104 is configured to receive the stored fluid 110 at the internal pressure of the high-pressure tank 100 and output the stored fluid 110 to the external system after reducing a fluid pressure of the stored fluid 110 from the internal pressure to the input pressure associated with the external system 112. In particular, the pressure regulator 104 can be configured to receive the stored fluid 110 from the high-pressure tank 100 at the internal pressure, reduce the fluid pressure of the stored fluid 110, and output the stored fluid 110 via the low-pressure coupling 108. Additionally, the input pressure of the external system 112 can be determined based at least on a power system 136 (e.g., a hydrogen fuel cell, a hydrogen engine, and liquid natural gas engine, etc.) of the external system. For example, the power system 136 can be configured to receive the stored fluid 110 at pressures between 5 pounds per square inch (PSI) and 120

PSI. Alternatively, the external system 112 can receive the stored fluid 110 at the input pressure utilized by the power system 136.

In some examples, the tank wall 102 can be configured to contain the stored fluid 110 within a high-pressure environment (e.g., pressures exceeding 100 bar, 500 bar, 1000 bar, etc.) such that an amount of the stored fluid 110 is stored and output, via the pressure regulator 104 to operate the external system 112. Additionally, the high-pressure tank 100 and the tank wall 102 can be configured to contain the stored fluid 110 and prevent the stored fluid 110 from escaping the high-pressure tank 100, wherein the stored fluid 110 can be a gas, a liquid, or a mixed-phased fluid. For example, the stored fluid 110 can be hydrogen, natural gas, and/or other fluids that are stored within the high-pressure tank 100 at the internal pressure and the high-pressure tank can be configured to contain the hydrogen within the high pressure environment, contain the natural gas in a liquified state at the internal pressure, and/or contain other fluids in the phase dictated by the internal pressure. Where the stored fluid is hydrogen, the tank wall 102 can be configured to substantially prevent the hydrogen from escaping the high-pressure tank 100 and store the gaseous hydrogen at the internal pressure. Due to the physical characteristics of hydrogen, stored hydrogen will commonly remain in the gas phase due to the condensation of hydrogen occurring at cryogenic temperatures. Alternatively, where the stored fluid is a condensable fluid such as natural gas, the high-pressure tank 100 can be configured to contain the stored fluid as a liquid or as a mixed-phase fluid (e.g., the stored fluid 110 exists as both a liquid and a gas within the high-pressure tank 100). Due to physical characteristics of the stored fluid 110, the internal pressure of the high-pressure tank may be greater than the pressure that causes the stored fluid to condense from the gaseous phase to the liquid. Accordingly, the high-pressure tank 100 and the tank wall 102 can be configured to contain gases, liquids, and mixed-phased fluids.

In some examples, the tank wall 102 can include an inner layer 116 and be configured to maintain the stored fluid 110 and/or other fluids disposed within the high-pressure tank 100 at the internal pressure. In particular, the inner layer 116 can be made from a fluid-impermeable material, wherein the fluid impermeable material can be selected based at least on the stored fluid 110. More specifically, the inner layer 116 can be formed from a polymeric, elastomeric, epoxy, metallic, or otherwise impermeable material that forms a substantially continuous fluid barrier within the high-pressure tank 100. It should be noted that the tank wall 102 can include a port, a hole, and/or other opening in the inner layer 116 that extends through the tank wall 102 such that the regulator mount 106 can be installed in the high-pressure tank 100. Additionally, the tank wall 102 can be comprised of a material that is capable of containing the internal pressure of the high-pressure tank 100. For example, the tank wall 102 can be a fiber-wound wall that is comprised of an outer layer of fibers that are deposited on the material of the inner layer 116 and combined with a thermo setting polymer "binder" to form the tank wall 102. The outer layer of the tank wall 102 can be formed from fibers that are layered onto the material of the inner layer, wherein the fibers of the outer layer may be carbon fibers, aramid fibers, polymeric fibers, fibers formed from amorphous materials (e.g., fiberglass), and/or other fibrous materials that may provide insulative benefits and/or structural benefits for the high-pressure tank 100. Alternatively, the tank wall 102 may be formed from a substantially solid polymeric, metallic, or other material that is configured to maintain the stored fluid 110 at the internal pressure of the high-pressure tank. Accordingly, the tank wall 102 can be formed from the inner layer 116 and the outer layer 118 such that the stored fluid 110 within the high-pressure tank is maintained at the internal pressure of the high-pressure tank 100.

In some examples, the tank wall 102 can include an outer layer 118 that is deposited on the inner layer 116 and is configured to provide structure and pressure-resistance for the high-pressure tank 100. In particular, the outer layer 118 can be configured to protect the high-pressure tank 100 from damage and dampen drops, strikes, hits, and other collisions to prevent damage to the high-pressure tank 100. Additionally, the tank wall 102 can include one or more attachment points 114 that are attached to the outer layer 118 and enable the high-pressure tank 100 to be secured to the external system 112 and/or to a mounting location for the high-pressure tank 100. For example, the attachment points can be configured to couple to the external system 112 via straps, a securing frame, fasteners, and/or other locking mechanisms to secure the high-pressure tank 100 at the mounting location. Further, the external system 112 can be a vehicle (e.g., a forklift, an automobile, hauling equipment, etc.) that includes the mounting location such that the high-pressure tank 100, when secured by the locking mechanisms, is removably attached to the external system 112 while the locking mechanisms are engaged. Alternatively, or in addition, the external system 112 can be a static system (e.g., a generator set, mounted equipment, etc.) that is associated with the mounting location such that the high-pressure tank 100, when secured by the locking mechanisms, maintains a fluid connection with the external system 112 to provide the stored fluid 110. Accordingly, the outer layer 118 can be configured to enable the high-pressure tank 100 to be secured such that the fluid connection is maintained between the external system 112 and the high-pressure tank 100.

In some examples, the pressure regulator 104 can be a high-pressure to low-pressure regulator that is configured to reduce a fluid pressure of the stored fluid 110 from the internal pressure of the high-pressure tank 100 to an input pressure of the external system 112. In particular, the pressure regulator 104 can be configured to receive the stored fluid 110 at the internal pressure (e.g., pressures exceeding 1 bar, 10 bar, 100 bar, 500 bar, 1000 bar, etc.) of the high-pressure tank 100 and decrease the fluid pressure from the internal pressure to a desired input pressure (e.g., pressures between 1 bar and 10 bar, 1 bar and 5 bar, etc.) of the external system 112 via expanding, throttling, and/or otherwise reducing the fluid pressure of the stored fluid 110. It should be noted that configuring the high-pressure tank 100 to include the pressure regulator 104 can enable a fluid connection between the low-pressure coupling 108 and the external system 112 to be a low-pressure fluid connection. Additionally, mounting the pressure regulator 104 to the high-pressure tank 100 stabilizes the high-pressure environment (e.g., the stored fluid 110 and the interior space 140 of the high-pressure tank 100) while reducing potential failure points. More specifically, periodic and/or aperiodic attaching and detaching of a high-pressure coupling can result in excessive wear and degradation of the high-pressure coupling at an accelerated rate compared to the low-pressure coupling 108. Accordingly, incorporation of the pressure regulator 104 can increase the lifetime of the low-pressure coupling 108 to the external system 112 due to the low-pressure coupling 108 experiencing reduced pressure when transferring the stored fluid 110 to the external system 112.

In some examples, the pressure regulator 104 can be mounted to the high-pressure tank 100 via the regulator mount 106. In particular, the regulator mount 106 can be integrated into the tank wall 102 such that a tank wall seal 120 forms a substantially fluid tight seal between the regulator mount 106 and the tank wall 102. Similarly, the regulator mount 106 can include an internal seal 122 that substantially prohibits the stored fluid 110 from passing from the interior space 140 of the high-pressure tank 100 to an ambient environment surrounding the high-pressure tank 100. The regulator mount 106 can be integrated into the tank wall 102 such that the inner layer 116 of the tank wall 102 is physically in contact with and/or extends along the regulator mount 106. Additionally, the tank wall seal 120 can form a substantially fluid tight seal with the outer layer 118 and/or the inner layer 116 due to the regulator mount 106 being integrated into the tank wall 102 during deposition of the outer layer 118. For example, the regulator mount 106 is connected to the inner layer 116 at a port, a hole, and/or other opening 134 in the inner layer 116 such that the outer layer 118 is deposited onto the inner layer 116 and the regulator mount 106, integrating the regulator mount 106 into the tank wall 102. The tank wall seal 120 can be a portion of the regulator mount 106 and/or in physical contact with the regulator mount 106 such that the outer layer 118 bonds with, adheres to, and/or otherwise combines with the tank wall seal 120 and the regulator mount 106. Alternatively, or in addition, the tank wall seal 120 can be installed with the regulator mount 106 after the outer layer 118 and the tank wall 102 have been formed, wherein the regulator mount 106 and the tank wall seal 120 are installed into the port, the hole, and/or other opening 134 in the tank wall 102, the inner layer 116, and the outer layer 118 such that the tank wall seal 120 forms a substantially fluid tight seal between the regulator mount 106 and the tank wall 102. Accordingly, the regulator mount 106 can form a substantially fluid tight seal with the tank wall 102 that contains the stored fluid 110 within the high-pressure tank 100.

In some examples, the pressure regulator 104 can include a lower portion 124 and an upper portion 126. In particular, the pressure regulator 104 can be a self-contained (e.g., components of the pressure regulator 104 are partially and/or fully sealed within the pressure regulator 104) system that is mounted to the regulator mount 106. Additionally, the pressure regulator can be formed by combining the lower portion 124 and the upper portion 126 to produce the pressure regulator 104 that is operable to receive the stored fluid 110 from the high-pressure tank 100 and output the stored fluid 110 to the external system 112. Further, the lower portion 124 of the pressure regulator 104 can be configured to connect with and/or be secured to the regulator mount 106 such that the pressure regulator 104 is secured to the high-pressure tank 100. It should be noted that the lower portion 124 of the pressure regulator 104 can be screwed into, bolted onto, adhered to, and/or otherwise connected with the regulator mount 106. Accordingly, the pressure regulator 104 can be installed onto the high-pressure tank 100 by connecting the lower portion 124 to the regulator mount 106. Accordingly, the pressure regulator 104, assembled from the lower portion 124 and the upper portion 126, can be secured to the regulator mount 106 via the lower portion 124. Alternatively, or in addition, the lower portion 124 of the pressure regulator 104 can be secured to the regulator mount 106 such that the upper portion 126 can be combined with the lower portion 124 to form the pressure regulator 104 and secure the pressure regulator to the high-pressure tank 100.

In some examples, the upper portion 126 of the pressure regulator 104 can be configured to form the pressure regulator 104 through combination with the lower portion 124. In particular, the upper portion 126 of the pressure regulator 104 can include the components of the pressure regulator 104. For example, the components of the pressure regulator 104 can include an upper wall of the pressure regulator, a lower wall of the pressure regulator, an input line 128, a pressure reducing component 130, and an output line 132. The upper portion 126 can include the upper wall, a portion of and/or all of the input line 128, the pressure reducing component 130, and/or the output line 132. Similarly, the lower portion 124 can include the lower wall and/or a second portion of the input line 128. Additionally, the upper portion 126 can be configured to combine with the lower portion 124 such that the input line 128 is in fluid communication with the stored fluid 110 and is exposed to the internal pressure of the high-pressure tank 100. Further, the upper portion 126 can be configured to combine with the lower portion 124 such that a fluid path is created that from the input line 128 to the low-pressure coupling 108 that traverses the pressure reducing component 130. Accordingly, the pressure regulator 104 is formed from the lower portion 124 and the upper portion 126 such that the stored fluid 110 is output by the high-pressure tank 100 at the input pressure of the external system 112.

In some examples, the input line 128 can be connected to and extend from the pressure reducing component 130 through the lower portion 124 of the pressure regulator and into the interior space 140 of the high-pressure tank 100. The input line 128 can be fluidly connected, via a channel of the input line 128, to the interior space 140 of the high-pressure tank 100. In particular, the input line 128 can extend through the tank wall 102, the regulator mount 106, and/or the inner layer 116 of the tank wall 102. Additionally, the internal seal 122 can be configured to form a substantially fluid tight seal between the input line 128 and the high-pressure tank 100. More specifically, the internal seal 122 can be located on an outer surface of the input line 128 and sealed to the regulator mount 106, the inner layer 116 of the tank wall 102, and/or the lower portion 124 of the pressure regulator 104. Further, the internal seal 122 can be configured to prevent the stored fluid 110 from being output from the high-pressure tank 100 before the stored fluid 110 passes through the pressure reducing component 130 of the pressure regulator 104. Accordingly, the input line 128 receives a first flow of the stored fluid 110 from the interior space 140 of the high-pressure tank 100 at the internal pressure of the high-pressure tank and directs the first flow to the pressure reducing component 130.

In some examples, the input line 128 can define a channel that the stored fluid 110 passes through to enter the pressure regulator 104. Alternatively, the pressure reducing component 130 can be configured such that a body of the pressure reducing component 130 forms the channel such that the stored fluid 110 passes through the opening 134 in the tank wall 102 and into the pressure reducing component 130 of the pressure regulator 104. The input line 128 can include one or more input line walls that define the channel of the input line 128 and fluidly connect the pressure reducing component 130 to the interior space 140 of the high-pressure tank 100. Additionally, an as noted above, the one or more input line walls can be substantially impermeable to the stored fluid 110 such that the internal seal 122 can form a substantially fluid tight seal with the input line 128 and prevent the stored fluid from leaking out of the high-pressure tank 100.

In some examples, the output line 132 can extend from the pressure reducing component 130 to the low-pressure coupling 108 through the upper portion 126 of the pressure regulator 104. In particular, the output line 132 can provide a fluid connection between the high-pressure tank 100 and the external system 112 via the low-pressure coupling 108. It should be noted that while the pressure regulator 104 is illustrated such that the output line 132 extends at an approximately 90 degree angle from the input line 128 and the pressure reducing component 130, the output line can be configured to extend parallel to the input line 128, at a 45 degree angle, or other angle such that the low-pressure coupling 108 is connected to external system 112. Additionally, the output line 132 can be a substantially rigid structure formed from metal(s), plastic(s), and/or other materials or a substantially flexible structure formed from mesh, polymer(s), rubber(s), and/or other materials. Accordingly, the output line 132 receives a second flow of the stored fluid 110 from the pressure reducing component 130 at the input pressure of the external system 112 and directs the second flow to the external system 112 via the low-pressure couple 108.

In some examples, the output line 132 can define an additional channel that provides the stored fluid 110 to the external system 112 after the pressure reducing component 130 has decreased the fluid pressure of the stored fluid 110 from the internal pressure to the input pressure of the external system 112. Alternatively, the pressure reducing component 130 can be configured such that the body of the pressure reducing component 130 forms the additional channel such that the low-pressure coupling 108 is physically and fluidly connected to the pressure reducing component 130. Accordingly, the stored fluid 110 is provided to the external system 112 via the additional channel. The output line 132 can include one or more output line walls that define the additional channel of the output line 132 and fluidly connect the pressure reducing component 130 to the external system 112. Additionally, an as noted above, the one or more output line walls can be substantially impermeable to the stored fluid 110 such that the stored fluid 110 exits the pressure reducing component 130 and is provided to the external system via the low-pressure coupling 108 via the output line 132.

Figure 5:
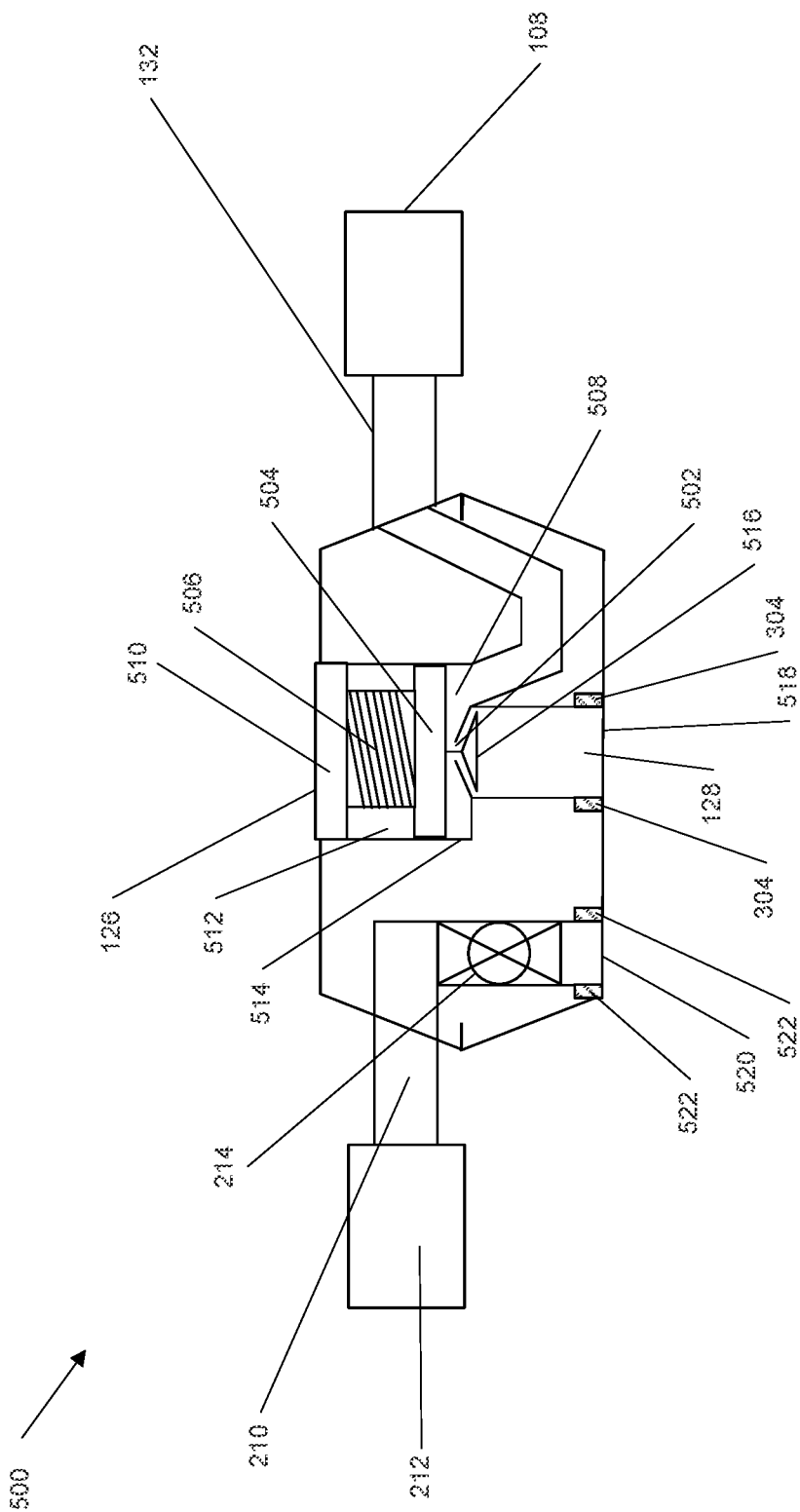
FIG. 5 illustrates an example pressure regulator that is removably attached to the high-pressure tank via a regulator mount that includes a pressure-drop chamber and a fill valve.

In some examples, and discussed in greater detail with respect to FIG. 5, the pressure reducing component 130 can be configured to receive the first flow of the stored fluid 110 via the input line 128 and output the second flow of the stored fluid 110 via the output line 132. In particular, and based at least on the internal components of the pressure regulator 104, the pressure reducing component 130 can be configured to receive the first flow at the internal pressure of the high-pressure tank 100 and output the second flow at the input pressure of the external system 112. For example, the pressure reducing component 130 can be configured as a throttling valve that causes the first flow to pass through an opening such that the pressure on a first side of the opening in fluid communication with the input line 128 is at the internal pressure while the second side of the opening in fluid communication with the output line 132 is at the input pressure of the external system 112. Additionally, the opening can be configured to modulate the second flow and the fluid pressure of the second flow output by the pressure reducing component 130. Alternatively, the pressure reducing component 130 can reduce the fluid pressure of the first flow from the internal pressure to the input pressure of the second flow via expansion of the first flow. It should be noted that while the pressure reducing component 130 is referenced as utilizing throttling and/or expansion of the flow of the stored fluid 110 to reduce the fluid pressure, other pressure reducing valves may be utilized to achieve the desires pressure reduction. Further, the pressure reducing component 130 can be configured to modulate the pressure reduction to account for a variable input pressure (e.g., the internal pressure of the high-pressure tank 100 changes as the stored fluid 110 is discharged) and ensure that the second flow is output at a substantially constant output pressure (e.g., the input pressure for the external system 112).

In some examples, the pressure reducing component 130 can be configured to output the stored fluid 110 to the external system 112 via the low-pressure coupling 108. In particular, the low-pressure coupling 108 can be configured to couple with a fluid coupling associated with the external system 112 and the power system 136. Additionally, the low-pressure coupling 108 can include a low-pressure coupling seal that is configured to form a fluid connection between the low-pressure coupling 108 and the fluid coupling of the external system 112 that substantially prevents the stored fluid 110 from leaking, spilling, and/or otherwise escaping the fluid connection created by the low-pressure coupling 108 and the fluid coupling. The low-pressure coupling seal can be configured to form an area seal (e.g., the low-pressure coupling seal is set into a trench and/or a channel such that an area is in contact with the area seal) with a first surface associated with either the low-pressure coupling 108 and/or the fluid coupling. Similarly, the low-pressure coupling seal can be configured to form a line seal (e.g., the low-pressure coupling seal is in contact with a surface such that a seal is formed at a circumference between the low-pressure coupling 108 and the fluid coupling) with a second surface associated with either the low-pressure coupling 108 and/or the fluid coupling. It should be noted that the seals (e.g., the area seal and the line seal) formed by the low-pressure coupling seal experience degradation over a period of time due to debris and other material wearing down the low-pressure coupling seal, the first surface, and the second surface during use of the high-pressure tank 100. Further, the low-pressure coupling seal can be more robust and be utilized for a longer lifetime relative to high-pressure fluid seals due to relative forces contained by the low-pressure coupling seal and high-pressure fluid seals. For example, the low-pressure coupling 108 and the low-pressure coupling seal can be configured to ensure that the ambient environment does not receive an amount of the stored fluid 110 that exceeds a lower flammability limit for the stored fluid 110 in an atmospheric environment (e.g., an amount of hydrogen may leak from the low-pressure coupling 108 that is sufficient to exceed the lower flammability limit if the low-pressure coupling seal has sufficiently degraded, enabling an ignition source to cause a fire or other safety hazard). Accordingly, the low-pressure coupling 108 can be configured to provide the stored fluid 110 to the external system 112 at the input pressure of the external system via a fluid channel sealed by the low-pressure coupling seal and substantially prevent the stored fluid 110 from leaking from the low-pressure coupling 108 and/or the external system 112.

In some examples, the external system 112 can include a power system 136 that receives the stored fluid 110 from the high-pressure tank 100 and an attachment receiver 138 that the one or more attachment points 114 are configured to combine with. As previously noted, the external system 112 can be a mobile machine (e.g., a fork-lift, a pallet-loader, etc.), industrial equipment (e.g., a crane, a tractor, etc.), and/or other equipment that is associated with the power system 136 and is configured to operate while powered by the power system 136. Additionally, the high-pressure tank 100 can be configured to attach to the external system 112 and/or be associated with the external system 112 such that the stored fluid 110 can be provided during operation of the external system 112. The high-pressure tank can be configured to attach to the external system via the one or more attachment points 114 coupling to the attachment receiver 138. The attachment receiver 138 can be a socket, a securing frame, a cradle, and/or other structure that is configured to receive the one or more attachment points 114 to secure the high-pressure tank 100. Further, the power system 136 can be configured such that the power system 136 is in fluid communication with the high-pressure tank 100 and receives the stored fluid 110 from the high-pressure tank 100 via the low-pressure coupling 108.

Accordingly, the pressure regulator 104 can be integrated into the high-pressure tank 100 to improve durability and safety features of the high-pressure tank 100. In particular, integrating the pressure regulator 104 with the high-pressure tank 100 can utilize the low-pressure coupling to fluidly connect the high-pressure tank 100 and the external system 112 via a low-pressure joint rather than a high-pressure joint. While high-pressure joints may be degraded via repeated coupling to and decoupling from the external system 112, low-pressure joins are commonly more robust due to the absence of internal seals that are configured to handle elevated pressures of the high-pressure tank. Additionally, as the high-pressure joints degrade, the high-pressure joints become increasingly susceptible to ruptures, leaks, and other failures. In contrast, the low-pressure joints are more durable and safer due to the lower pressures that are transferred via the low-pressure joints. Accordingly, the low-pressure joint that created by connecting the low-pressure coupling 108 to the external system 112 will degrade at a slower rather, remain operationally viable for an extended component lifetime, and provide a safer fluid conduit between the high-pressure tank 100 and the external system 112.

Additionally, in examples where the stored fluid 110 is hydrogen and/or other gases with similar properties, the utilization of the pressure regulator 104 enables filling of the high-pressure tank 100 to be disassociated from utilization of the stored fluid 110. In particular, pressurization the high-pressure tank 100 with hydrogen (and other similar gases) causes a temperature of high-pressure tank 100 and the hydrogen to increase, wherein an increase in the temperature also causes the hydrogen to expand and further increase the pressure inside the high-pressure tank 100. The increase in pressure from both injecting the hydrogen into the high-pressure tank 100 and heating of the hydrogen due to the pressurization of the hydrogen within the high-pressure tank 100 results in the high-pressure tank 100 reaching a maximum fill pressure (e.g., the maximum pressure that the high-pressure tank 100 can store, accounting for safety factors). However, due to the both the injection of hydrogen and the heating of the hydrogen pressurizing the high-pressure tank, the internal pressure of the high-pressure tank 100 drops below the maximum fill pressure without outputting hydrogen due to the hydrogen and the high-pressure tank 100 reaching thermal equilibrium with the ambient environment. Accordingly, utilization of the low-pressure coupling 108 and integrating the pressure regulator 104 enables the high-pressure tank 100 to be removed and equilibrate during filling, resulting in the high-pressure tank 100 being completed filled.

Figure 2:
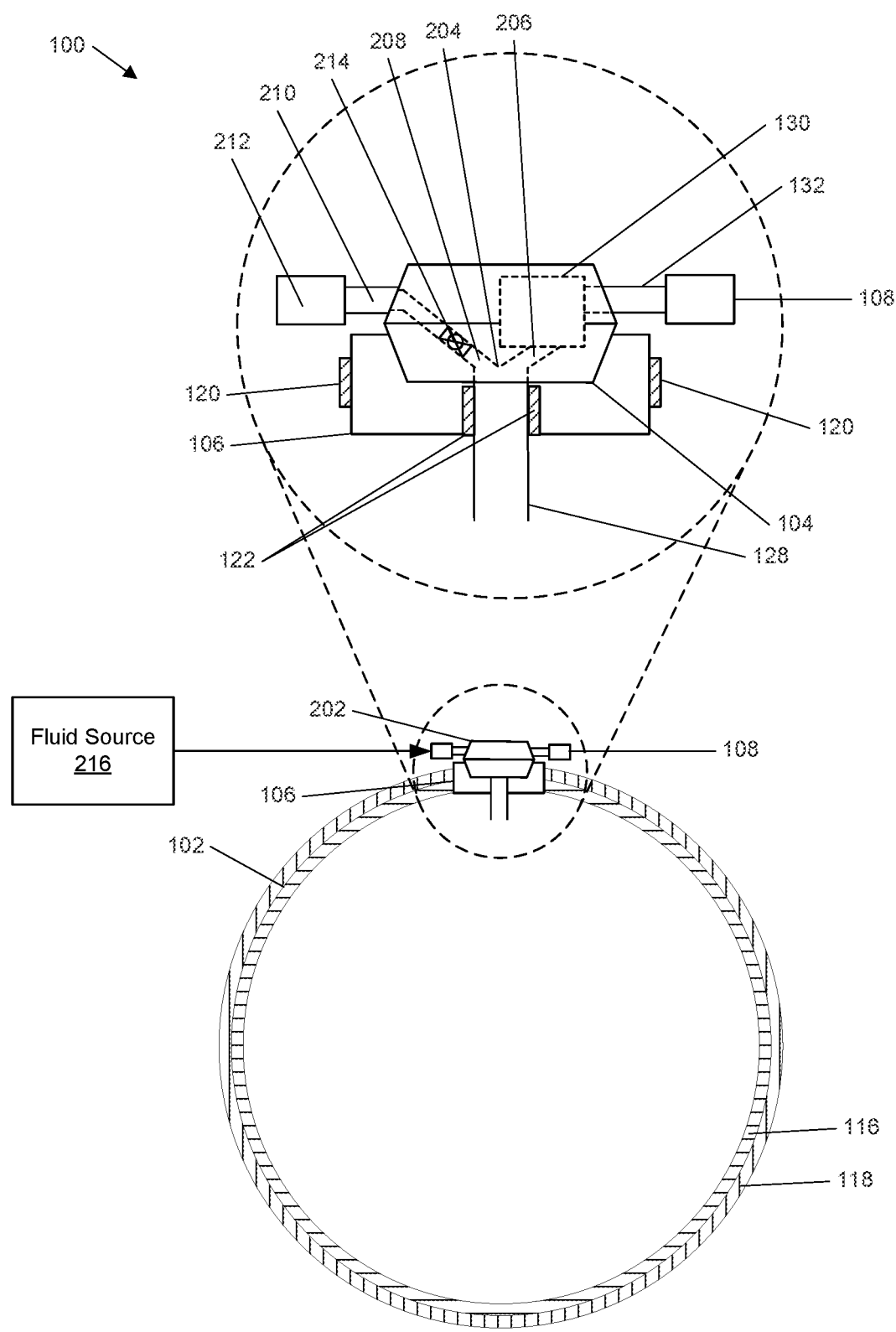
FIG. 2 illustrates an example high-pressure tank that includes a pressure regulator configured to connect to an external system and a fluid source.

FIG. 2 illustrates an example high-pressure tank 100. Similar to FIG. 1, the high-pressure tank 100 is depicted and described as including the tank wall 102, the regulator mount 106, the low-pressure coupling 108, and the stored fluid 110. Additionally, the high-pressure tank 100 can include a pressure regulator 202 that includes the input line 128, the pressure reducing component 130, and the output line 132 of the pressure regulator 104, but also includes a split connector 204, a first branch 206, a second branch 208, a fill line 210, and a fill coupling 212. Further, the pressure regulator 202 can be a static fixture of the high-pressure tank 100 that enables the high-pressure tank 100 to be connected to the external system 112 via the low-pressure coupling 108 and/or a filling system via the fill coupling 212.

In some examples, the split connector 204 is configured to fluidly connect the first branch 206 with the input line 128. In particular, the first branch 206 can be connected to the split connector 204 such that the stored fluid 110 can be received and/or obtained from the interior space 140 of the high-pressure tank 100 via the input line 128 and directed to the pressure reducing component 130. Additionally, the split connector 204 can be configured to open and close the fluid connection from the input line 128 to the first branch 206, such as via an internal valve of the split connector 204 and/or the first branch 206. The internal valve of the split connector 204 and/or the first branch 206 can be manually controlled to transition from an open state (e.g., input line 128 in fluid communication with the first branch 206) to a closed state (e.g., input line 128 sealed from the first branch 206). Alternatively, the internal valve of the split connector 204 and/or the first branch can be controlled by a controller associated with the high-pressure tank 100. Accordingly, the split connector 204 can fluidly connect the interior space 140 of the high-pressure tank 100 with the pressure reducing component 130.

In some examples, the split connector 204 is configured to fluidly connect the second branch 208 with the input line 128. In particular, the second branch 208 can be connected to the split connector 204 such that the stored fluid can be received from the fill coupling 212 and input into the interior space 140 of the high-pressure tank 100. Additionally, the second branch 208 includes a check valve 214 that is configured to enable the high-pressure tank to be filled from a fluid source. More specifically, the check valve 214 can be configured to open and close the fluid connection between the fill coupling 212 and the interior space 140 of the high-pressure tank 100 such that connecting the fill coupling 212 to the fluid source and opening the check valve 214 to enables the stored fluid 110 to fill the high-pressure tank 100. Further, the check valve 214 is installed in the second branch 208 of the split connector 204 such that the fill line 210 and the fill coupling 212 can be fluidly isolated from the first branch 206 and the input line 128 while the high-pressure tank is discharging and/or not being filled. Accordingly, the split connector 204 and the second branch 208 can be configured to fluidly connect the high-pressure tank 100 with the check valve 214.

In some examples, the check valve 214 can be configured to enable the high-pressure tank 100 to be refilled independently of the external system 112. In particular, the input line 128, the first branch 206 and the second branch 208 of the split connector 204, the fill line 210, and the fill coupling 212 can be configured to receive the stored fluid 110 from a fluid source 216 and direct the stored fluid 110 at the internal pressure and/or at pressures approaching the internal pressure of the high-pressure tank 100. More specifically, the fluid source 216 can provide the stored fluid 110 at a fluid source pressure such that the internal pressure of the high-pressure storage tank approaches the fluid source pressure (e.g., the fluid source 216 is configured to output the stored fluid 110 as a pressurized fluid to the high-pressure storage tank, the stored fluid pressurized to pressures exceeding 10 bar, 100 bar, 500 bar, 1000 bar, etc. by the fluid source 216). In comparison, the pressure reducing component 130 is configured to drop the fluid pressure of the stored fluid 110 from the internal pressure to the input pressure for the external system 112 and output the stored fluid 110 via the output line 132. Accordingly, the check valve 214 can be configured to restrict the stored fluid 110 from traversing the second branch 208 of the split connector 204 and being released via the fill line 210 and the fill coupling 212 while the high-pressure tank 100 is discharging the stored fluid 110 to the external system 112. Similarly, the first branch 206 of the split connector 204 can be configured to prevent the stored fluid 110 from being released while the high-pressure tank 100 is being filled via the low-pressure coupling 108 being sealed (e.g., preventing the stored fluid 110 from exiting) while disconnected from the external system 112 and/or an additional valve being added, similar to the check valve 214, for the first branch 206. Alternatively, or in addition, the split connector 204 and/or the check valve 214 can be configured to have a first state and a second state, wherein the first state enables fluid communication from the input line 128 through the low-pressure coupling 108 (e.g., discharging the stored fluid 110) and the second state enables fluid communication from the fill coupling 212 through the input line 128 (e.g., filling the high-pressure tank 100 with the stored fluid 110).

In some examples, the pressure regulator 202 can enable the high-pressure tank 100 to be a reusable tank that is capable of discharging the stored fluid 110 and being refilled after fully discharging. In particular, the pressure regulator 202 can be configured such that the input line 128, the first branch 206 of the split connector 204, the pressure reducing component 130, and the low-pressure coupling 108 output the stored fluid 110 to the external system 112. Additionally, the pressure regulator 202 can be configured such that the input line 128, the second branch 208 of the split connector 204, the check valve 214, and the fill coupling 212 receive the stored fluid 110 to fill the high-pressure tank 100. As noted above, the high-pressure tank can be removably attached to the external system 112 via the low-pressure coupling 108 to discharge the stored fluid 110 for utilization by the power system 136 of the external system 112. Further, and once the high-pressure tank 100 has discharged the stored fluid 110, the high-pressure tank can be decoupled from the external system 112 and coupled to the fluid source 216 via the fill coupling 212. Due to the high-pressure tank 100 being removably coupled to both the fluid source 216 and external system 112, during filling and discharging respectively, the fill coupling 212 and the low-pressure coupling 108 can be specialized for the respective purpose of the couplings.

In some examples, the low-pressure coupling 108 can be configured for repeated coupling and decoupling from the external system 112, withstanding use and vibration associated with user in conjunction with the external system 112, and for outputting the stored fluid based on the external system 112. In particular, discharging the stored fluid 110 from the high-pressure tank 100 to the external system 112 can utilize the low-pressure coupling 108, wherein the low-pressure coupling 108 is configured to repeatedly couple and decouple from the external system 112. Additionally, the low-pressure coupling 108 can be configured to provide the stored fluid to the external system 112, wherein the stored fluid 110 can be utilized by the external system 112 as fuel (e.g., the stored fluid 110 is hydrogen and is utilized as fuel by an engine of the external system 112).

Further, the low-pressure coupling 108 can be exposed to vibrations, impacts, and other external forces generated by the external system 112 and by use in association with the external system 112. Accordingly, the low-pressure couple 108 can be configured to be removably attached to the external system 112 and to substantially contain and direct the stored fluid 110 to the external system 112 during operation of the external system 112.

In some examples, the fill coupling 212 can be configured for coupling to and decoupling from the fluid source 216. In particular, the fill coupling 212 can be a high-pressure coupling that is configured to receive the stored fluid 110 from the fluid source 216 at the internal pressure of the high-pressure tank 100 or other elevated fluid pressure and direct the stored fluid into the high-pressure tank 100. Additionally, and based at least on the fill coupling 212 being configured to contain high-pressure fluids, the fill coupling 212 can be configured to be stabilized and secured during filling of the high-pressure tank 100. More specifically, the fill coupling 212 can be configured such that wear and tear on the fill coupling 212 are minimized during filling of the high-pressure tank 100. Due to the internal pressure of the high-pressure tank exceeding 100 bar, 500 bar, and/or 1000 bar of pressure, the fill coupling 212 and the check valve 214 can be configured to minimize external forces experienced by the fill coupling 212 and prevent degradation of internal fluid seals of the fill coupling 212. Accordingly, the fill coupling 212 can be configured to be removably attached to the fluid source 216 and to substantially contain and direct the stored fluid 110, at the internal pressure of the high-pressure tank 100 or other comparable pressure, into the high-pressure storage tank.

Accordingly, the pressure regulator 202 can be configured to enable the high-pressure tank 100 to discharge and be filled via the low-pressure coupling 108 and the fill coupling 212. In particular, the external system 112 may operate under and cause conditions that accelerate the degradation of high-pressure joints. Additionally, filling of the high-pressure tank 100 with some fluids, such as hydrogen, can benefit from being isolated from the external system 112 such that the stored fluid 110 within the high-pressure tank 100 is permitted to reach a temperature equilibrium and a pressure equilibrium with the fluid source 216. By ensuring that the stored fluid 110 reaches the temperature equilibrium and the pressure equilibrium can ensure that the high-pressure tank 100 is fully filled by the stored fluid 110. Further, the incorporation of the split connector 204 and the branches of the split connector 204 to isolate filling components from discharge components enables the pressure regulator 202 to specialize the fill coupling 212 and the low-pressure coupling 108 for the respective purposes.

Figure 3:
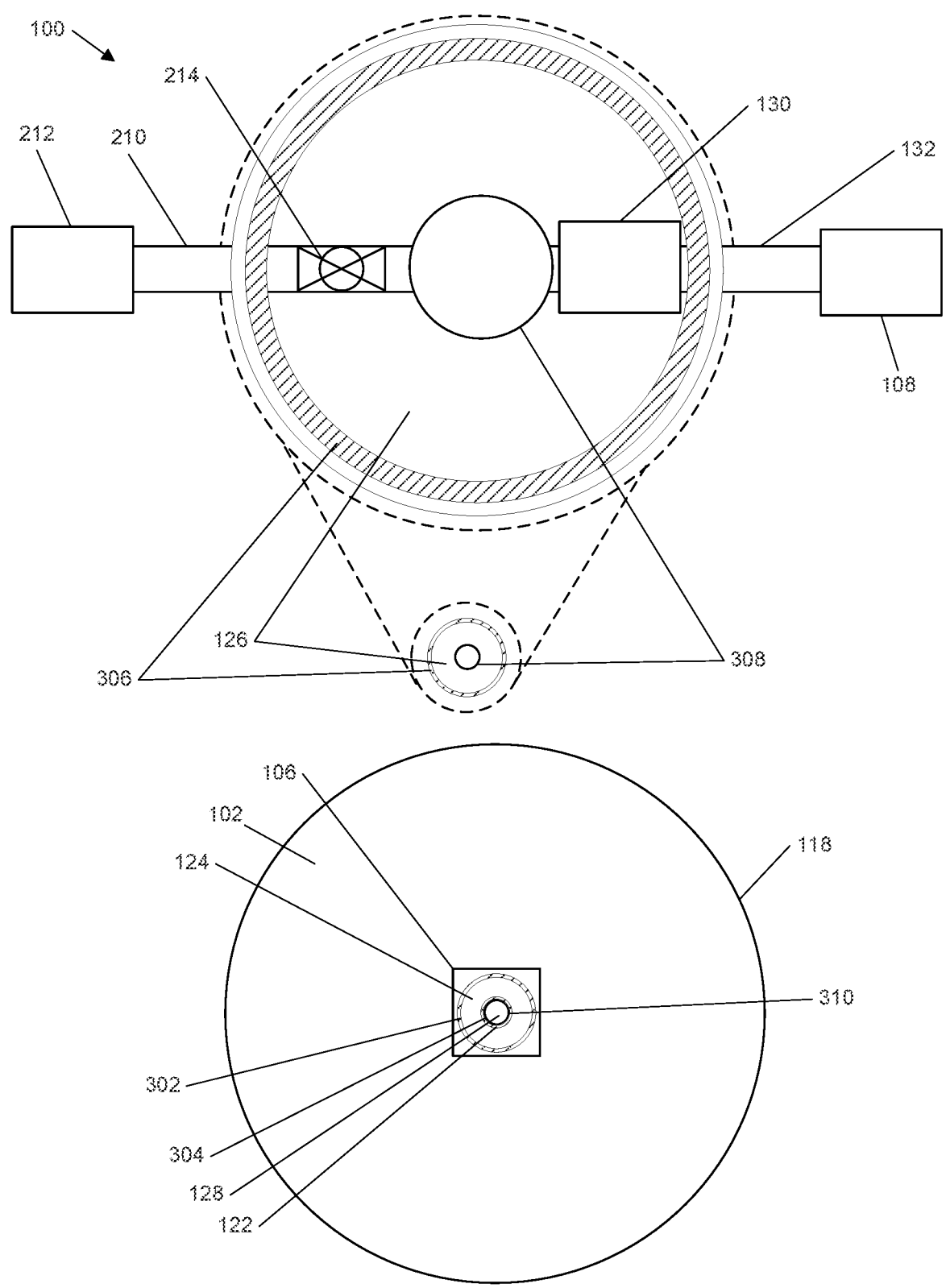
FIG. 3 illustrates an example high-pressure tank that includes a pressure regulator removably attached to the high-pressure tank via a regulator mount.

FIG. 3 illustrates an example high-pressure tank 100. Similar to FIG. 1 and FIG. 2, the high-pressure tank 100 is depicted and described as including the tank wall 102, the regulator mount 106, the low-pressure coupling 108, and the stored fluid 110. Additionally, the high-pressure tank 100 can include the pressure regulator 202 that includes the input line 128, the pressure reducing component 130, and the output line 132 of the pressure regulator 104. Similarly, the pressure regulator 202 can include the split connector 204, the first branch 206, the second branch 208, the fill line 210, and the fill coupling 212 of the pressure regulator 202. However, the pressure regulator 202 can be configured such that a portion of the pressure regulator 202 and/or the entire pressure regulator 202 is removably attached to the regulator mount 106. Accordingly, the pressure regulator 202 can include a lower seal surface 302, an input line seal 304, an upper sealing surface 306, and an upper portion 308 of the input line 128.

In some examples, the pressure regulator 202 (or the pressure regulator 104) can be configured to be removably attached to the high-pressure tank 100. In particular, the pressure regulator 202 can be configured such that a portion of the pressure regulator 202 can be removed from the high-pressure tank 100 for maintenance and/or repairs. For example, the upper portion 126 of the pressure regulator 202 can be configured to be removed from the lower portion 124 of the pressure regulator 202. Additionally, removal of the upper portion 126 can also remove the low-pressure coupling 108, the pressure reducing component 130, the output line 132, the split connector 204, the first branch 206, the second branch 208, the fill line 210, and/or the fill coupling 212 from high-pressure tank 100. Removal of the upper portion 126 can expose the internal components of the pressure regulator 202 and expose the interior space 140 of the high-pressure tank 100. Accordingly, the upper portion 126 can be removed (and should only be removed for safety reasons) when the internal pressure of the high-pressure tank 100 is approximately equal to atmospheric pressure (e.g., 1 bar, 1.5 bar, etc.).

In some examples, the pressure regulator 202 (or the pressure regulator 104) can be configured to be removably attached to the regulator mount 106. In particular, the pressure regulator 202 can be configured such that the pressure regulator can be detached and removed from the regulator mount 106 and the high-pressure tank 100 for maintenance and/or repairs. Additionally, and similar to the discussion above, removal of the pressure regulator 202 from the regulator mount 106 can enable internal components of the pressure regulator 202 to be exposed for maintenance. Accordingly, the pressure regulator 202 can be removed from the high-pressure tank for maintenance on the pressure regulator 202 and/or the high-pressure tank 100.

In some examples, lower portion 124 of the pressure regulator 202 can include the lower seal surface 302 and the upper portion 126 of the pressure regulator 202 can include the upper seal surface 306. In particular, the pressure regulator 202 can include a substantially fluid tight seal that is formed between the lower seal surface 302 and the upper seal surface 306 while the lower portion 124 and the upper portion 126 of the pressure regulator 202 are coupled together. Additionally, the lower portion 124 and the upper portion 126 of the pressure regulator 202 can be configured to be secured together via complementary threading (e.g., the lower portion 124 and the upper portion 126 screw together via a first set of threads and a second set of threads), fasteners, bolts, screws, clamps, and/or other mechanical securing devices. Further, the lower seal surface 302 and/or the upper seal surface 306 can be in physical contact while the lower portion 124 and the upper portion 126 are coupled together such that the stored fluid 110 is substantially prevented from leaking out of the high-pressure tank 100 and/or the pressure regulator 202 into an ambient environment surrounding the high-pressure tank 100. Accordingly, the lower seal surface 302 and the upper seal surface 306 can be configured such that when the pressure regulator 202 is assembled, a substantially fluid tight seal is formed to isolate the interior of the pressure regulator 202 from the ambient environment.

In some examples, the lower portion 124 of the pressure regulator 202 can be configured to form a substantially fluid tight seal with the upper portion 126 and the input line 128. In particular, the lower portion 124 can include the input line seal 304 that is disposed around an opening in the tank wall 102 and/or a lower portion 310 of the input line 128 that extends through the tank wall 102. It should be noted that the input line seal 304 may be configured as an o-ring, a polymeric surface, and/or other sealing component that substantially prevents Additionally, in some examples, the input line seal 304 can be a portion of the internal seal 122 that forms a substantially fluid tight seal between an input line wall that defines the input line 128 and the lower portion 124. More specifically, the input line seal 304 can be the portion of the internal seal 122 that extends along the input line 128 into the pressure regulator 202. Alternatively, or in addition, the input line seal 304 can be separate from the internal seal 122 and can form the substantially fluid tight seal between at least the input line 128 and the lower portion 124. Further, the input line seal 304 can be disposed such that a substantially fluid tight seal is formed between the upper portion 308 and the lower portion 310 of the input line 128 when the pressure regulator 202 is assembled.

In some examples, the upper portion 308 and the lower portion 310 can form the input line 128 while the pressure regulator 202 is assembled. In particular, the upper portion 308 can be connected to the upper portion 126 of the pressure regulator 202 and attached to the split connector 204 (or the pressure reducing component 130 as shown in FIG. 1). Additionally, the upper portion 308 of the input line 128 can be a segment of the input line wall that is attached to the pressure reducing component 130 and/or the split connector 204 and configured to fluidly connect with the lower portion 310 of the input line 128. Similarly, the lower portion 310 can be connected to the lower portion 124 of the pressure regulator 202 (or the pressure regulator 104) and extend through the opening 134 in the tank wall 102. Further, the upper portion 308 and the lower portion 310 of the input line 128 can be configured to join and form a sealed fluid channel that directs the stored fluid from the high-pressure tank 100 to the split connector 204 and/or the pressure reducing component 130.

Figure 4:
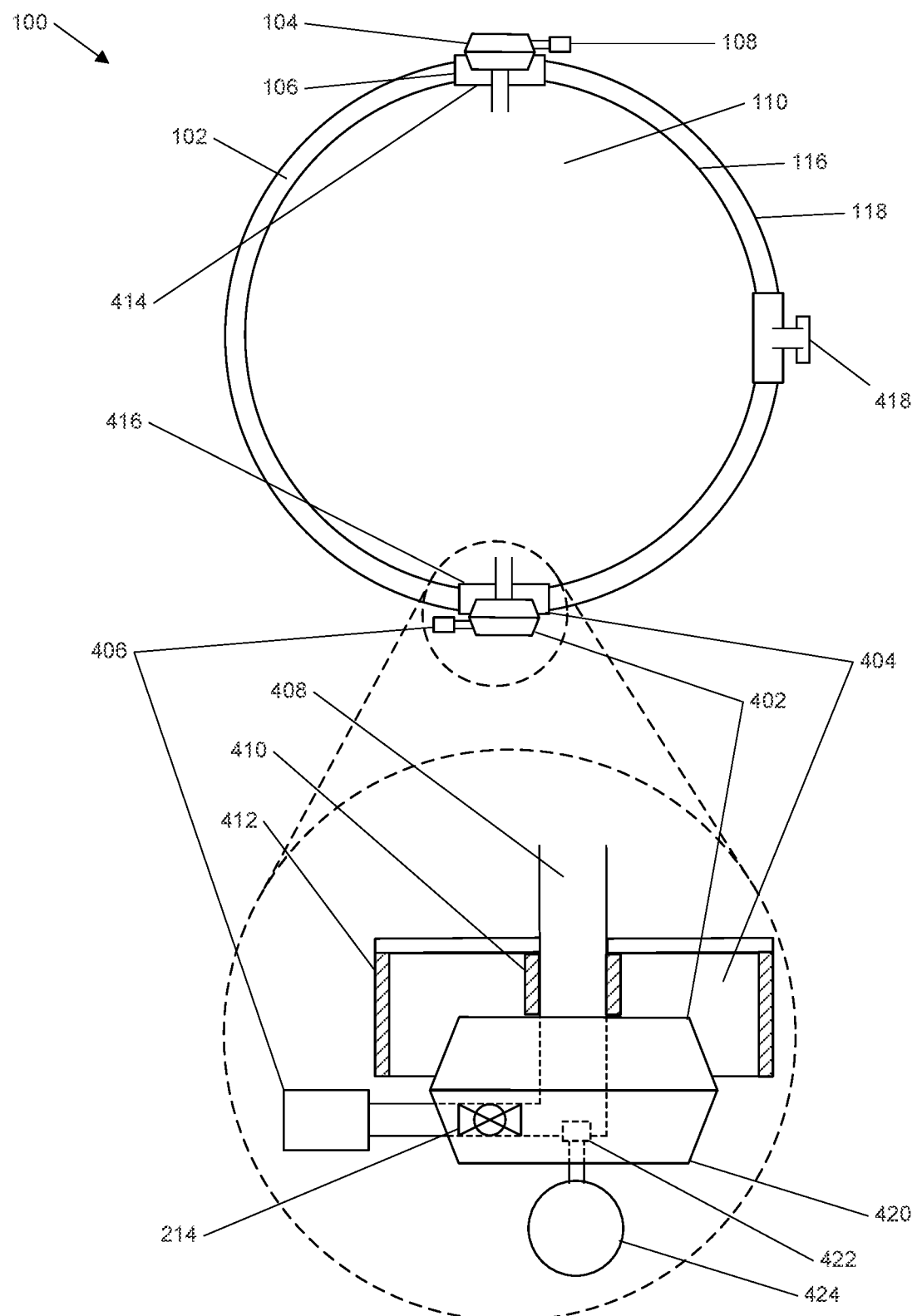
FIG. 4 illustrates an example high-pressure tank that includes a pressure regulator removably attached to the high-pressure tank via a regulator mount, and a fill coupling that enables the high-pressure tank to be refilled after discharge.

FIG. 4 illustrates an example high-pressure tank 100. Similar to FIG. 1, the high-pressure tank 100 is depicted and described as including the tank wall 102, the regulator mount 106, the low-pressure coupling 108, and the stored fluid 110. Additionally, the high-pressure tank 100 can include the pressure regulator 104 including the input line 128, the pressure reducing component 130, and the output line 132. Additionally, the high-pressure tank 100 can include a filling port 402 that is mounted to a fill mount 404, includes a fill coupling 406, and provides the stored fluid 110 to the high-pressure tank via a fill line 408. Accordingly, the high-pressure tank 100 can the pressure regulator 104 and the filling port 402 that is separate from the pressure regulator 104.

In some examples, the filling port 402 can be configured to enable the high-pressure tank 100 to be filled from a fluid source 216 similar to the split connector 204, the second branch 208, the fill line 210, the fill coupling 212, and the check valve 214 as discussed by FIG. 2. However, while capable of achieving a similar result as the components discussed by FIG. 2, the filling port 402 can be a component of the high-pressure tank 100 that is independent of the pressure regulator 104 and/or the pressure regulator 202. In particular, the pressure regulator 104 is disposed on the high-pressure tank 100 at a first position 414 and the filling port 402 is disposed on the high-pressure tank 100 at a second position 416. Additionally, the first position 414 and the second position 416 can be selected based at least on an attachment point 418 that is configured to secure the high-pressure tank 100 in association with at least one of the external system 112 and/or the fluid source 216. Further, while the first position 414 and the second position 416 are illustrated as being located substantially opposite each other on the high-pressure tank, the first position 414 and/or the second position 416 can be disposed at any position on the tank wall 102. Accordingly, the high-pressure tank 100 can be configured to include the pressure regulator 104 and the filling port 402.

In some examples, the filling port 402 can be configured similar to the pressure regulator 104, wherein the filling port 402 includes a port housing 420 that encapsulates internal components of the filling port 402. Alternatively, and not illustrated by FIG. 4, the filling port 402 can be simplified to include the fill coupling 406 in fluid communication with the fill line 408 and the check valve 214, wherein the filling port 402 is a substantially linear fluid channel that traverses the tank wall 102. For example, the filling port 402 can be attached to the fill mount 404 such that an internal seal 410 of the fill mount 404 substantially contains the stored fluid 110 within the high-pressure tank 100 and causes fluid received via the fill coupling 406 to be directed into the high-pressure tank 100 via the fill line 408. Additionally, the fill line 408 can extend through the tank wall 102 and the fill mount 404 substantially perpendicular to the tank wall 102 such that the fill coupling 406 is exposed on and/or in proximity to the outer layer 118 of the tank wall 102. Further, the check valve 214 can be configured similar to the check valve 214, wherein the check valve 214 is configured to restrict the flow of the stored fluid 110 through the filling port 402 such that the stored fluid 110 may enter the high-pressure tank 100 during filling and prevent the stored fluid 110 from exiting the high-pressure tank 100 via the filling port 402.

In some examples, the filling port 402 can be configured to include additional components beyond the fill coupling 406, the fill line 408, and the check valve 214 to facilitate improved functionality of the filling port 402. In particular, the filling port 402 can include the port housing 420 that contains a portion of the fill line 408, the check valve 214, a pressure sensor 422, and a pressure gauge 424. Additionally, the port housing 420 can be removably attached to the fill mount 404 such that the filling port 402 and the associated components can be removed from the high-pressure tank 100 for maintenance. Further, the fill mount 404 can include the internal seal 410, configured to form a substantially fluid tight seal around a perimeter of the fill line 408, and a tank wall seal 412. Configured to form a substantially fluid tight seal around an additional perimeter of the fill mount 404. The fill mount 404 can be integrated into the tank wall such that the inner layer 116 and the outer layer 118 of the tank wall 102 envelope and/or partially envelop the fill mount 404. Accordingly, the fill mount 404 can be integrated into the tank wall 102 of the high-pressure tank 100 such that the filling port 402 and components of the filling port 402 are removably attached to the high-pressure tank via the fill mount 404.

In some examples, the filling port 402 can include the pressure sensor 422 and the pressure gauge 424 that are configured to determine the internal pressure of the high-pressure tank. In particular, the fill line 408 can include the pressure sensor 422 such that the pressure sensor 422 is exposed to the stored fluid 110 within the high-pressure tank. Additionally, the fill line 408, while the high-pressure storage tank is being filled by the fluid source 216 via the fill coupling 406 and the fill line 408, can expose the pressure sensor 422 to the stored fluid 110 that is received by the high-pressure tank 100 from the fluid source 216. Further, the pressure sensor can be in communication with the pressure gauge 424 and/or a controller associated with the high-pressure tank 100 and report the internal pressure of the high-pressure tank 100. It should be noted that while the pressure sensor 422 and the pressure gauge 424 are associated with the filling port 402, the pressure sensor 422 can be mounted within the pressure regulator 104 and/or the pressure regulator 202. More specifically, the pressure sensor 422 can be mounted within one or more of the fill line 408, the input line 128, the split connector 204, the first branch 206, the second branch 208, the output line 132, and/or other fluid channels of the high-pressure tank 100. Further, additional pressure sensors can be mounted to the high-pressure tank 100 such that the internal pressure of the high-pressure tank 100 is detected by a first pressure sensor and the output pressure of the low-pressure coupling 108 is detected by a second pressure sensor. Accordingly, the pressure sensor 422 and one or more additional pressure sensors can be configured to determine one or more pressures associated with the high-pressure tank 100 and report the one or more pressures via the pressure gauge 424, additional pressure gauges, and/or a controller associated with the high-pressure tank 100.

Accordingly, the filling port 402 can be disposed at the second position on the tank wall 102 of the high-pressure tank 100 and enable the stored fluid 110 to be provided to the high-pressure tank 100 by the fluid source 216. Additionally, the fill coupling 406 can be configured to connect to the fluid source 216, receive the stored fluid 110 and direct the stored fluid into the high-pressure tank 100 via the check valve 214 and the fill line 408. Further, the filling port 402 and the associated components can be physically isolated and distinct from the pressure regulator 104 such that when the pressure regulator 104 is in use and the high-pressure tank 100 is associated with the external system 112, the filling port 402 is protected and/or isolated from the high-pressure tank 100 discharging the stored fluid 110. Similarly, the pressure regulator and associated components can be physically isolated and distinct from the filling port 402 such that when the high-pressure tank 100 is being filled, the pressure regulator 104 is protected and/or isolated from the fluid source 216. It should be noted that the pressure regulator 104 and/or the filling port 402 can be associated with protective shrouds that extend from the external surface of the high-pressure tank 100 and protect the respective components from impacts and being struck.

FIG. 5 illustrates an example pressure regulator 500. Similar to the pressure regulator 202 described by FIG. 2, the pressure regulator 500 is depicted and described as including the low-pressure coupling 108, the input line 128, the output line 132, the fill line 210, the fill coupling 212, and the check valve 214. Additionally, the pressure reducing component 130 can comprise a throttling gap 502, a diaphragm 504, a loading component 506, an output chamber 508, and a measurement component 510. Further, the pressure reducing component 130 can be configured to reduce the fluid pressure of the stored fluid from the internal pressure of the high-pressure tank 100 to the input pressure for the external system 112. It should be noted that while the pressure regulator 500 may include a consolidated port and/or opening in the tank wall 102 that the fill pathway (e.g., fluid connection from the fill coupling 212, through the check valve 214, and into the high-pressure tank 100) and the discharge pathway (e.g., fluid connection from the input line 128, through the pressure reducing component 130, and to the external system 112 via the low-pressure coupling 108) are connected to, via the split connector 204, the first branch 206, the second branch 208, such that the high-pressure tank 100 is able to receive and discharge the stored fluid 110. Alternatively, or in addition, the fill pathway and the discharge pathway may be separated within the pressure regulator 500.

In some examples, the pressure regulator 500 can be a pressure reducing regulator that is configured to receive a fluid flow from the high-pressure tank 100, reduce the fluid pressure of the fluid flow to the input pressure of the external system 112, and output the fluid flow via the low-pressure coupling 108. In particular, the pressure regulator 500 depicts a configuration of the pressure reducing component 130 that is configured to direct the fluid flow through the throttling gap 502 and into an expansion chamber 512. Additionally, the pressure regulator 500 can be configured such that the internal pressure of the high-pressure tank 100 causes the fluid flow to compress the loading component 506 by applying force to the diaphragm 504 and/or a sealing component 516. Further, compressing the loading component 506 opens a fluid connection between the input line 128, the expansion chamber 512, and the output chamber 508, wherein the fluid flow passes through the output chamber 508, into the output line 132, and through the low-pressure coupling 108. For example, the loading component 506 may be configured as a compressible spring, a pneumatic cylinder, a hydraulic cylinder, or other component that is configured to apply force to and/or absorb force from the diaphragm. Accordingly, the pressure reducing component 130 can be configured to reduce the fluid pressure of the fluid flow via the force applied to the diaphragm 504 by the fluid flow.

In some examples, the pressure regulator 500 can be configured similar to the pressure regulator 104 or the pressure regulator 202 such that a single opening in the tank wall 102 is utilized to transfer the stored fluid 110 between the internal components of the pressure regulator 500 and the interior space 140 of the high-pressure tank. Alternatively, and as illustrated by FIG. 5, a first opening 518 can be in fluid communication with the throttling gap 502 via the input line 128 and a second opening 520 can be in fluid communication with the check valve 214. Additionally, the first opening 518 can be in fluid communication with the input line 128 such that the input line seal 304 fluidly seals the input line 128 to the first opening 518 and directs the stored fluid 110 into the input line 128. It should be noted that the input line 128 can extend into the interior space 140 of the high-pressure tank 100 or can be in fluid communication with the interior space 140 via the first opening 518. Similarly, the second opening 520 can be in fluid communication with the fill line 210 via the check valve 214 such that an additional seal 522 fluidly seals the fill line 210 to the second opening 520 and directs the stored fluid 110 received from the fluid source 216 into the high-pressure tank 100. Further, the fill line 210 can be configured, similar to the input line 128, to extend through the second opening 520 and into the interior space 140 of the high-pressure tank 100 or can be in fluid communication with the interior space 140 via the second opening 520.

In some examples, the throttling gap 502 and the loading component 506 can be configured to reduce the fluid pressure of the fluid flow from the internal pressure of the high-pressure tank 100 to the input pressure of the external system 112. In particular, the throttling gap 502 and the loading component 506 can be configured based at least on a balance of forces within the pressure reducing component 130 as approximately described by the below equation:

$$F=(P_i-P_o)s+P_oS+f$$

It should be noted that F indicates a first force applied by the loading component 506 via the diaphragm 504, f indicates a second force applied by a sealing component 516, $P_i$ indicates the internal pressure of the fluid flow (e.g., the fluid pressure of the fluid flow within the input line 128), $P_o$ indicates the input pressure of the external system 112 (e.g., the fluid pressure of the fluid flow within the output line 132), s indicates a first surface area of the throttling gap 502, and S indicates a second surface area of the diaphragm 504. Further, while the above equation gives an approximate description for configuring the pressure regulator 500 (or the pressure regulator 104), additional components and features can be utilized to modify the behavior and the equation representing the pressure reducing component 130. Accordingly, the above equation can be utilized to determine an approximation of how the pressure reducing component 130 can be configured.

In some examples, the throttling gap 502 can be associated with a sealing component 516 that is configured to maintain the fluid flow to the external system 112 at the input pressure. In particular, the sealing component 516 can be configured such that the loading component 506 applies the first force to the diaphragm 504 and extends within the expansion chamber 512 such that the diaphragm 504 approaches the throttling gap 502, the sealing component 516 opens the throttling gap 502 to enable the fluid flow to pass into the expansion chamber 512. Additionally, the sealing component 516 can be configured such that the fluid flow applies the second force to the sealing component, compressing the loading component 506 and moving the diaphragm away from the throttling gap 502. Accordingly, the loading component 506 and the sealing component 516 can be configured such that the fluid flow is at least partially self-regulating. More specifically, higher internal pressures of the high-pressure tank 100 can apply a greater force to the sealing component 516, compressing the loading component 506 and reducing a cross-sectional area of the throttling gap 502 to reduce the flow rate of the stored fluid 110 into the expansion chamber 512. Similarly, lower internal pressures of the high-pressure tank 100 can apply a lesser force to the sealing component 516, permitting the loading component 506 to extend and increase the cross-sectional area of the throttling gap 502 to increase the flow rate of the stored fluid 110 into the expansion chamber 512.

In some examples, the throttling gap 502 can be configured to regulate the fluid flow without the sealing component 516. In particular, the sealing component 516 can be omitted and the diaphragm 504 can be configured to regulate the fluid flow via the first force applied by the loading component 506. More specifically, where the sealing component 516 is not included, the diaphragm can modulate the fluid pressure of the fluid flow based at least on the first force being applied to the diaphragm 504 by the loading component 506 to oppose the force applied by the fluid flow due to the internal pressure of the high-pressure tank 100. Additionally, the loading component 506 can be configured to modulate the fluid flow by increasing the applied first force as the loading component 506 is compressed, by having a compression limit that prevents the loading component 506 from compressing beyond the compression limit, and other limitations for the fluid flow. Accordingly, the loading component 506 can be configured to permit the fluid flow to be output by the high-pressure tank 100 when the internal pressure of the high-pressure tank 100 exceeds a pressure threshold and to reduce the fluid pressure of the fluid flow to the input pressure of the external system 112.

In some examples, the output chamber 508 can be configured to receive the fluid flow via the throttling gap 502 and a portion 514 of the expansion chamber 512 that is in fluid communication with the throttling gap 502 and the output chamber 508. In particular, the stored fluid 110 may be permitted to exit the high-pressure tank 100 through the input line 128, exposing the portion 514 of the expansion chamber 512 to the fluid flow by applying the second force to the sealing component 516 and/or the diaphragm 504. The second force compresses the loading component 506 such that the diaphragm 504 is separated from the throttling gap 502 and the fluid flow can pass through the throttling gap 502 and into the expansion chamber 512. More specifically, the diaphragm 504 can be configured to prevent the fluid flow from passing between the diaphragm 504 and the walls of the expansion chamber 512 such that the fluid flow is directed from the throttling gap 502 to the output chamber 508 and ultimately through the low-pressure coupling 108. Additionally, loading component 506 can be configured such that the second force, while capable of compressing the loading component 506 to enable the fluid flow to pass through the throttling gap 502, does not cause the sealing component 516 to prevent the fluid flow from passing through the throttling gap 502. Alternatively, or in addition, the sealing component 516 can be configured such that the fluid flow through the throttling gap 502 has a minimum flow rate that is permitted by the sealing component 516 independent of the second force applied by the fluid flow. Accordingly, the fluid flow can apply the second force to the diaphragm 504 and/or the sealing component 516 such that the output chamber 508 is in fluid communication with the portion 514 of the expansion chamber 512 and the throttling gap. Further, the fluid flow can pass from the output chamber 508 through the low-pressure coupling 108 and into the external system 112.

In some examples, the measurement component 510 can be configured to apply the first force to the diaphragm 504 via the loading component 506. In particular, the measurement component 510 can be configured to adapt the first force applied by the loading component 506 based at least on the second force applied by the fluid flow through the input line 128 and the throttling gap 502. More specifically, the second force applied by the fluid flow is generally not a static force. Instead, the second force is generally dependent on a number of factors, include the internal pressure of the high-pressure tank 100 (e.g., the internal pressure changes as the stored fluid 110 is discharged), the cross-sectional area of the throttling gap 502 that the fluid flow passes through (e.g., the cross-sectional area of the throttling gap 502 may be partially restricted by the sealing component 516 depending on a position of the sealing component 516), and other variables that are defined based at least on the physical properties of the fluid flow. Additionally, the second force can be measured by the measurement component 510 based at least on the compression of the loading component 506 within the expansion chamber 512 and/or based at least on an indication of the internal pressure of the high-pressure tank. Further, based at least on the second force and/or the internal pressure, the measurement component 510 can be configured to increase or decrease the first force applied by the loading component 506. The first force applied by the loading component 506 can be further modified by compression of the loading component 506, wherein compression of the loading component 506 can increase the first force applied by the loading component 506 and extension of the loading component can decrease the first force applied by the loading component 506.

In some embodiments, the measurement component 510 can be provided an indication of an output pressure to maintain for the fluid flow and can be configured to provide the first force, via the loading component 506, to reduce the fluid pressure of the fluid flow from the internal pressure of the high-pressure tank 100 to the output pressure. In general, the high-pressure tank 100 can be associated with the output pressure such that the pressure regulator 500 is configured to output the fluid flow at a substantially constant output pressure that is defined based at least on the input pressure of the external system 112. Additionally, the indication of the output pressure may be a static value that is provided to the measurement component 510 via a handle on the pressure regulator 500 that enables a user to set the output pressure and/or via a configuration that is set during assembly of the pressure regulator 500. Accordingly, the measurement component 510 can be configured to maintain the fluid flow to the low-pressure coupling 108 at the output pressure such that the fluid flow is received by the external system 112 at the input pressure of the external system 112.

Figure 6:
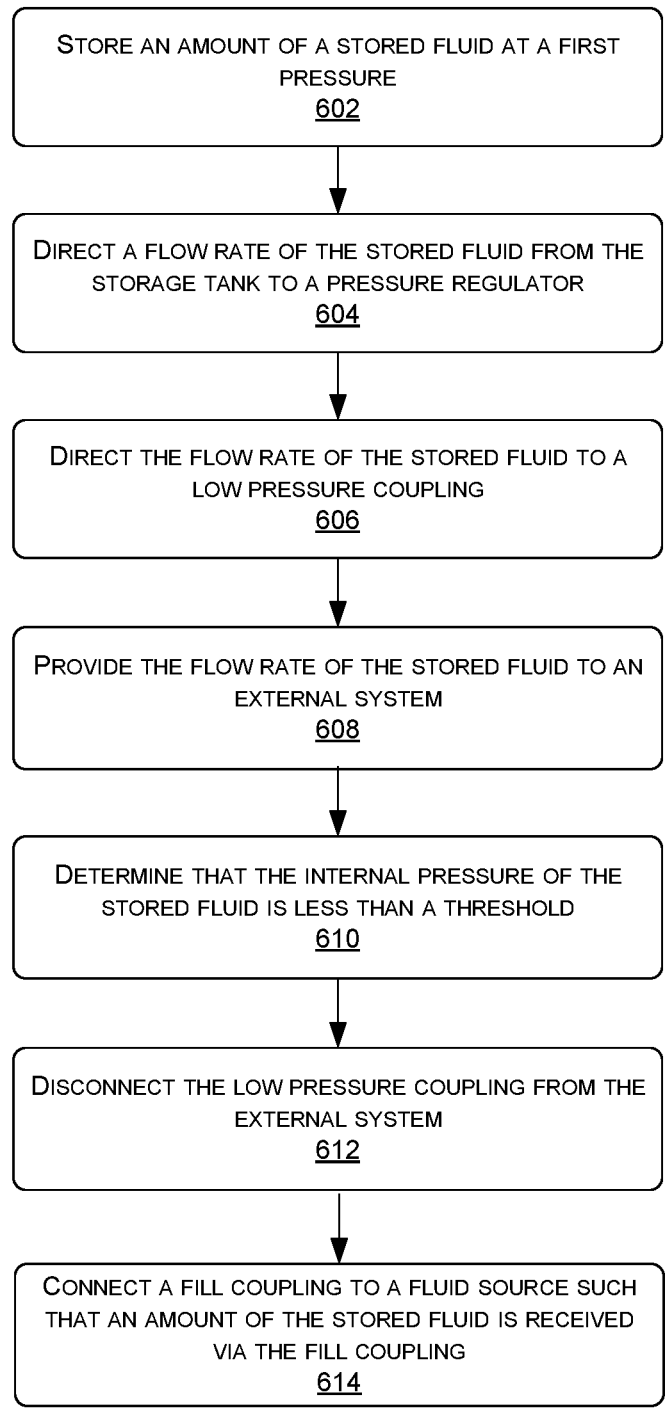
FIG. 6 shows a flow chart illustrating an example method for utilizing a pressure regulator to discharge high-pressure fluid from a high-pressure tank to an external system via a low-pressure coupling.

FIG. 6 is a flowchart illustrating a method for utilizing an example pressure regulator to discharge high-pressure fluid from a high-pressure tank to an external system 112 via a low-pressure coupling. The method 600 may be performed by one or more human users. Additionally, and/or alternatively, one or more steps of the method 600 may be performed automatically without human intervention. The method 600 may include different and/or additions steps, or perform steps in a different order than described herein.

At block 602, a storage tank (e.g., the high-pressure tank 100) can be configured to store an amount of a stored fluid at a first pressure. In particular, the storage tank can store up to a maximum amount of the stored fluid at a maximum pressure of the storage tank. The maximum amount of the stored fluid can be determined based at least on a volume of the interior space 140 of the storage tank (e.g., cubic feet, cubic meters, liters, etc.) and the amount of the stored fluid that can be contained within the volume of the interior space 140 at the maximum pressure. Additionally, the maximum pressure can be a design consideration of the storage tank that is determined based at least on one or more materials that the storage tank is constructed from, safety factors, storage tank design, and other considerations. Further, the amount of the stored fluid and the first pressure may vary between the maximum amount of the stored fluid at the maximum pressure and a minimum amount of the stored fluid at a minimum pressure. The minimum pressure of the stored fluid may be determined based at least on a pressure reducing component (e.g., pressure reducing component 130) of a pressure regulator (e.g., pressure regulator 104, pressure regulator 202, etc.) (e.g., the minimum pressure is utilized to drive the stored fluid through the pressure reducing component) and/or safety considerations (e.g., the minimum pressure is greater than atmospheric pressure to maintain a positive pressure relative to ambient pressure and prevent oxygen from entering the storage tank). Similarly, the minimum amount can be determined based at least on the amount of the stored fluid that produces the minimum pressure within the interior space 140 of the storage tank.

At block 604, a flow rate of the stored fluid can be directed from the interior space 140 of the storage tank to a pressure regulator that is fluidly connected to the storage tank. In particular, the flow rate of the stored fluid can be received by an input line (e.g., the input line 128) that is fluidly connected to the storage tank and provides the flow rate of the stored fluid to the pressure regulator. Additionally, the input line can include a split connector (e.g., the split connector 204) that is configured to fluidly connect the input line and the storage tank during discharge of the stored fluid. More specifically, the split connector can include a valve (e.g., the check valve 214 or an internal valve of the split connector) configured to direct the flow rate of the stored fluid from the storage tank to a first branch (e.g., the first branch 206) of the split connector or a second branch (e.g., the second branch 208) of the split connector, the first branch fluidly connected to the input line and the pressure regulator.

At block 606, the flow rate of the stored fluid can be directed from the pressure regulator to a low-pressure coupling (e.g., the low-pressure coupling 108) and to an external system (e.g., external system 112) fluidly connected to the low-pressure coupling. In particular, the pressure regulator receives the flow rate of the stored fluid from the input channel and causes a fluid pressure of the stored fluid to drop from a first pressure to a second pressure before directing the flow rate of the stored fluid to the low-pressure coupling. As noted above, the pressure drop from the first pressure to the second pressure can be achieved by throttling components (e.g., a throttling gap that reduces the fluid pressure), expansion components (e.g., an expansion volume that reduces the fluid pressure by allowing the stored fluid to expand within the expansion volume), and resistive load components (e.g., pressure reducing components that apply an amount of force to the stored fluid and cause the pressure drop). Additionally, the pressure regulator can be configured to provide a variable pressure drop for the flow rate of the stored fluid. More specifically, and as the amount of the stored fluid within the storage tank decreases, the first pressure will reduce while the storage tank discharges the stored fluid to the external system. Further, the pressure regulator can be configured to receive the variable first pressure and output the second pressure as a constant pressure determined based at least on an input pressure of the external system. Accordingly, the pressure regulator can output the flow rate of the amount of fluid at the second pressure via an output line and the low-pressure coupling.

At block 608, the flow rate of the stored fluid can be provided to the external system and/or a power system of the external system via the low-pressure coupling. In particular, the storage tank can be a fuel tank for the external system that outputs the stored fluid as fuel for the power system. Accordingly, during operation of the external system, the storage tank, the pressure regulator, and the low-pressure coupling can be configured to provide a substantially constant flow rate of the stored fluid at a substantially constant pressure.

At block 610, the internal pressure of the storage tank and the stored fluid can fall below a pressure threshold. In particular, a pressure gauge can be configured to determine and/or output the internal pressure of the storage tank to a user, a controller, or other monitoring component associated with the storage tank. Additionally, the internal pressure of the storage tank can be determined as below the pressure threshold that indicates that the storage tank is substantially empty and/or that the stored fluid should no longer be extracted from the storage tank.

At block 612, the storage tank can be fluidly disconnected from the external system based at least on the internal pressure being less than the pressure threshold. Additionally, the storage tank can be physically disconnected from the external system such that the storage tank can be removed from the external system and/or be replaced by an additional storage tank. Further, the low-pressure coupling, the pressure regulator, and/or the input line can be configured to be fluidly sealed prior to disconnection from the external system. For example, the input line and/or the output line can include an internal valve that fluidly seals the storage tank before the low-pressure coupling is disconnected from the external system. Alternatively, the split connector can be operable to fluidly connect the interior space 140 of the storage tank with the second branch, the second branch including a check valve that fluidly seals the second branch. Accordingly, the storage tank can be fluidly sealed to prevent compounds from the ambient environment from entering the storage tank and possibly reacting with the stored fluid.

At block 614, the storage tank can be fluidly connected to a fluid source via a fill coupling and the check valve. In particular, the storage tank can be associated with and fluidly connected to the fluid source via the fill coupling such that the storage tank can be refilled with the stored fluid. The fluid source may be configured to provide the stored fluid at the maximum pressure of the storage tank such that the maximum amount of the stored fluid may be provided to the storage tank. However, as noted above, the maximum amount of the stored fluid may be provided during a period of time where the interior space 140 of the storage tank reaches thermal equilibrium with the ambient environment and pressure equilibrium with the fluid source (e.g., pressurizing hydrogen causes the hydrogen to heat and expand, resulting in an incomplete fill if not permitted to reach temperature equilibrium with the ambient environment and pressure equilibrium with the fluid source). Further, the storage tank can be permitted to reach temperature equilibrium and pressure equilibrium while fluidly connected to the fluid source or can be repeatedly disconnected and reconnected until the maximum amount of the stored fluid is within the storage tank. As noted above, the fill coupling can be fluidly connected to the interior space 140 independent of the pressure regulator and/or be fluidly connected to the interior space 140 via the split connector of the pressure regulator.

INDUSTRIAL APPLICABILITY

The present disclosure describes example systems and methods for filling high-pressure tanks with various stored fluid, and providing the stored fluids to an external system via a low-pressure coupling. The example systems and methods described herein utilize an at least partially integrated pressure regulator that receives the stored fluid at high pressure and outputs the stored fluid at an input pressure of the external system. Additionally, a fill coupling can connect the high-pressure tank to a fluid source 216, while the tank is disconnected from the external system, and permit the high-pressure tank to reach a state of substantial temperature and pressure equilibrium with the fluid source 216. In such examples, the high-pressure tank can be connected and disconnected from the external system via a safe and stable low pressure coupling due to the pressure regulator being incorporated into the high-pressure tank. More specifically, the pressure regulator reduces an output pressure of the high-pressure tank system such that a connection with the external system does not have to withstand the high pressure (e.g., greater than 100 bar) fluid stored with the high-pressure tank. By reducing the pressure via the pressure regulator before the stored fluid is output to the external system, the low-pressure coupling may prevent escape of the stored fluid without additional pressure seals and components designed to withstand the internal pressure of the high-pressure tank. Accordingly, the low-pressure coupling can simplify the fluid connection between the external system and the high-pressure tank. Further, the low-pressure coupling can be designed for increased durability while providing superior safety due to the omission of failure points associated with a high-pressure connection with the external system.

Accordingly, the pressure regulator and fill coupling of the present disclosure create a reusable high-pressure tank that is able to withstand use in connection to an external system. The pressure regulator can reduce the damage and degradation of an output coupling to the external system by reducing the pressure of the stored fluid before the stored fluid reaches the output coupling. Additionally, the fill coupling can be configured to enable the high-pressure tank to be refilled via a fluid source 216 while permitting the high-pressure tank to reach equilibrium with the fluid source 216 such that the fluid tank is substantially completely filled by the stored fluid. Because the high-pressure tank can be connected and disconnected from both the external system and the fluid source 216 via couplings optimized for the operating environment of the external system and the fluid source 216, the useful life of the high-pressure tank is extended. Additionally, integration of the pressure regulator into the high-pressure tank can isolate high-pressure components (e.g., the storage tank, the input line, the pressure regulator, the check valve, etc.) from the low-pressure coupling to the external system. More specifically, isolating the high-pressure components that contain the stored fluid and withstand the internal pressure from the repeatedly coupled and decoupled low-pressure coupling prevents degradation of high-pressure seals within a high-pressure coupling. Accordingly, the low-pressure coupling and the integrated pressure regulator can form a high-pressure tank that can be removed from the external system and is a safer storage solution for the high pressures of the stored fluid.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A compressed fluid storage assembly, comprising:
a storage tank having a tank wall, the tank wall including an inner layer defining an interior space, the interior space being configured to store a compressed fluid at a first pressure;
a pressure regulator connected to the storage tank, wherein the pressure regulator comprises:
an input line extending through the tank wall, the input line fluidly connected to the interior space via a first opening in the inner layer,
an internal seal sealing an outer surface of the input line to the inner layer, and
a pressure reducing component comprising a throttling valve and fluidly connected to the input line;
a low-pressure coupling fluidly connected to the pressure regulator, pressure reducing component being configured to receive the compressed fluid, at the first pressure, via the input line, and to direct the compressed fluid to the low-pressure coupling at a second pressure less than the first pressure, the low-pressure coupling being configured to form a releasable fluid connection with an external system, and to direct the compressed fluid, at the second pressure, to the external system via the releasable fluid connection; and
a fill coupling fluidly connected to the interior space, the fill coupling being configured to receive the compressed fluid, at the first pressure, and to direct the compressed fluid to the interior space.

2. The compressed fluid storage assembly of claim 1, wherein the pressure regulator further comprises:
an upper portion that includes the pressure reducing component, an output line, and the low-pressure coupling; and
a lower portion, wherein the upper portion is removably connected to the lower portion.

3. The compressed fluid storage assembly of claim 2, wherein:
the tank wall further comprises an outer layer;
the lower portion is formed integral with the outer layer of the tank wall; and
the lower portion includes an input channel seal disposed around an opening in the lower portion, the opening being configured to direct the compressed fluid from the storage tank to the pressure reducing component.

4. The compressed fluid storage assembly of claim 1, wherein:
the pressure regulator further comprises an output line;
the compressed fluid storage assembly further comprising a regulator mount formed integral with the storage tank; and
the regulator mount including an opening that fluidly connects the pressure regulator with interior space via the input line and being configured to couple with the pressure regulator.

5. The compressed fluid storage assembly of claim 1, wherein the pressure regulator is at least partially integrated into the outer layer of a storage tank wall.

6. The compressed fluid storage assembly of claim 1, wherein the pressure regulator includes:
an output line fluidly connected to the low-pressure coupling, the output line being configured to direct the compressed fluid to the external system via the low-pressure coupling.

7. The compressed fluid storage assembly of claim 6, wherein the pressure reducing component includes a throttling gap, a diaphragm, and a compressible spring,
the pressure reducing component being configured to receive the compressed fluid at the first pressure via the input line, and output the compressed fluid at the second pressure via the output line, and
the diaphragm and the compressible spring being configured to allow the compressed fluid to flow through the pressure reducing component and apply an amount of force that reduces the compressed fluid from the first pressure to the second pressure.

8. The compressed fluid storage assembly of claim 1, wherein the pressure regulator includes:
an expansion chamber fluidly connected to the input line and the low-pressure coupling, the expansion chamber configured to receive the compressed fluid via the input line.

9. The compressed fluid storage assembly of claim 1, wherein the inner layer of the storage tank is substantially impermeable to the compressed fluid.

10. The compressed fluid storage assembly of claim 1, wherein the fill coupling is fluidly connected to the input line of the pressure regulator via a split connector, the split connector configured such that the storage tank is fluidly connected to the pressure regulator while discharging the compressed fluid to the external system, and is fluidly connected to the fill coupling while receiving the compressed fluid from a fluid source.

11. The compressed fluid storage assembly of claim 1, wherein:
the fill coupling is fluidly connected to the interior space via a second opening in the storage tank.

12. A machine, comprising:
a power system configured to receive compressed hydrogen, and generate output power using the compressed hydrogen as an input;
a storage tank defining an interior space, the interior space being configured to store the compressed hydrogen at a first pressure, the storage tank comprising a tank wall having an inner layer;
a pressure regulator connected to the storage tank, wherein the pressure regulator comprises:
an input line extending through the inner layer, the input line fluidly connected to the interior space of the storage tank;
an internal seal sealing an outer surface of the input line to the inner layer;
a pressure reducing component comprising a throttling valve; and
a low-pressure coupling fluidly connected to the pressure regulator, the pressure reducing component being configured to receive the compressed hydrogen, at the first pressure, from the interior space, and to direct the compressed hydrogen to the low-pressure coupling at a second pressure less than the first pressure, the low-pressure coupling being configured to form a releasable fluid connection with the power system, and direct the compressed hydrogen, at the second pressure, to the power system via the releasable fluid connection; and
a fill coupling fluidly connected to the interior space, the fill coupling being configured to receive the compressed hydrogen, at the first pressure, and to direct the compressed hydrogen to the interior space.

13. The machine of claim 12, wherein the pressure regulator and the fill coupling are configured such that,
while the pressure regulator is fluidly connected to the interior space, the fill coupling is fluidly disconnected from the interior space, and
while the fill coupling is fluidly connected to the interior space, the pressure regulator is fluidly disconnected from the interior space.

14. The machine of claim 12, wherein:
the pressure regulator is fluidly connected to the interior space and receives the compressed hydrogen via a first opening in the storage tank; and
the fill coupling is fluidly connected to the interior space and provides the compressed hydrogen via a check valve and a second opening in the storage tank.

15. The machine of claim 12, wherein the power system is a hydrogen engine or a hydrogen fuel cell that is releasably fluidly connected to the storage tank via the low-pressure coupling.

16. A method, comprising:
storing, within a storage tank having a tank wall, the tank wall including an inner layer defining an interior space, a compressed fluid at a first pressure, the storage tank including a pressure regulator, wherein the pressure regulator comprises:
an input line extending through the inner layer, the input line fluidly connected to the interior space of the storage tank via a first opening in the storage tank;
an internal seal sealing an outer surface of the input line to the inner layer;
a pressure reducing component comprising a throttling valve;
directing the compressed fluid from the storage tank through the input line and into the pressure regulator, the throttling valve of the pressure regulator reducing a pressure of the compressed fluid from the first pressure to a second pressure less than the first pressure;
directing the compressed fluid, at the second pressure, from the pressure regulator to a low-pressure coupling, the low-pressure coupling configured to provide the compressed fluid to an external system; and
providing the compressed fluid, at the second pressure, to the external system via the low-pressure coupling.

17. The method of claim 16, further comprising:
determining that the first pressure of the compressed fluid within the storage tank is less than a pressure threshold;
disconnecting the low-pressure coupling from the external system, wherein the low-pressure coupling is fluidly sealed while disconnected from the external system;
connecting, via a fill coupling, the storage tank to a fluid source; and
receiving, via the fill coupling, additional compressed fluid at substantially the first pressure.

18. The method of claim 17, wherein receiving the additional compressed fluid further comprises:
determining, that the first pressure of the compressed fluid within the storage tank is greater than an additional pressure threshold;
determining, after a period of time, that the first pressure of the storage tank is less than the additional pressure threshold; and
receiving, via the fill coupling, further compressed fluid at substantially the first pressure.

19. The method of claim 17, wherein the fill coupling is fluidly connected to a check valve, the check valve configured to fluidly seal the fill coupling while the compressed fluid is provided to the external system and fluidly connect the fill coupling with the compressed fluid while receiving the compressed fluid from the fluid source.

20. The method of claim 16, further comprising:
receiving the compressed fluid at an input channel of the pressure regulator;
directing the compressed fluid into an expansion chamber of the pressure regulator via a throttling gap, the throttling gap and the expansion chamber configured to reduce the compressed fluid from the first pressure to the second pressure; and
directing the compressed fluid to the low-pressure coupling via an output channel of the pressure regulator.

\* \* \* \* \*